United States Patent
Govindassamy

(10) Patent No.: US 10,123,230 B1
(45) Date of Patent: Nov. 6, 2018

(54) METHOD AND APPARATUS FOR MEASUREMENT INFORMATION TRANSMISSION AT A HOTSPOT DEVICE

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 49 days.

(21) Appl. No.: 15/290,664

(22) Filed: Oct. 11, 2016

(51) Int. Cl.
  *H04L 1/00* (2006.01)
  *H04W 24/10* (2009.01)
  *H04L 5/00* (2006.01)
  *H04W 56/00* (2009.01)

(52) U.S. Cl.
  CPC ........... *H04W 24/10* (2013.01); *H04L 5/0048* (2013.01); *H04W 56/001* (2013.01)

(58) Field of Classification Search
  CPC ... H04W 24/10; H04W 56/001; H04W 24/02; H04W 72/042; H04L 5/0048; H04L 5/0058; H04L 5/0041; H04L 1/1812
  See application file for complete search history.

(56) References Cited

U.S. PATENT DOCUMENTS

| | | | |
|---|---|---|---|
| 8,219,118 B2 | 7/2012 | Kim et al. | |
| 8,521,194 B2 | 8/2013 | Laroia et al. | |
| 8,806,530 B1 | 8/2014 | Izdepski et al. | |
| 9,119,153 B2 | 8/2015 | Deivasigamani et al. | |
| 2008/0080407 A1 | 4/2008 | Abbate et al. | |
| 2009/0059795 A1 | 3/2009 | Fonseca, Jr. et al. | |
| 2009/0157799 A1 | 6/2009 | Sukumaran et al. | |
| 2012/0142328 A1* | 6/2012 | Awoniyi | H04W 36/22 455/418 |
| 2013/0301451 A1* | 11/2013 | Siomina | H04W 24/00 370/252 |
| 2014/0050086 A1* | 2/2014 | Himayat | H04N 21/2365 370/230 |
| 2014/0066132 A1 | 3/2014 | Burke et al. | |
| 2015/0018010 A1* | 1/2015 | Fischer | H04W 4/023 455/456.2 |

(Continued)

OTHER PUBLICATIONS

U.S. Appl. No. 15/233,488, filed Aug. 10, 2016. Title: Method and Apparatus for Broadcast Information Transmission.

*Primary Examiner* — Abdelnabi O Musa
(74) *Attorney, Agent, or Firm* — Lerner, David, Littenberg, Krumholz & Mentlik, LLP

(57) ABSTRACT

Internet, voice calls, and messaging services have become ubiquitous and the means by which the services are accessed varies widely. The number and types of devices that may use these services have also proliferated. To serve a number and variety of client devices, a mobile Hotspot may be used, which is a device that may include a modem for mobile broadband access and a short range wireless link to distribute the services to local devices which may have such connectivity. Power consumption of battery powered client devices is an important consideration. A method and apparatus are disclosed that enable a client device to receive measurements of mobile network neighbor cells from a mobile Hotspot over a short range wireless link which may reduce power consumption of client devices.

58 Claims, 18 Drawing Sheets

(56) References Cited

U.S. PATENT DOCUMENTS

| | | | |
|---|---|---|---|
| 2015/0163041 A1* | 6/2015 | Kodali | H04L 1/1812 370/252 |
| 2015/0208457 A1 | 7/2015 | Thanayankizil et al. | |
| 2016/0227351 A1 | 8/2016 | Gu et al. | |

\* cited by examiner

METHOD AND APPARATUS FOR MEASUREMENT INFORMATION TRANSMISSION AT A HOTSPOT DEVICE

CROSS REFERENCE TO RELATED APPLICATIONS

This application is related to U.S. patent application Ser. No. 15/233,488 filed Aug. 10, 2016, and U.S. patent application Ser. No. 15/296,571 filed Oct. 18, 2016, the disclosures of which are hereby incorporated herein by reference.

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service provides high data rates it is often referred to as broadband internet service. Broadband internet service is generally understood to be a service that is always on and offers data rates in the order of mega-bits per second for both download and upload.

A client device as defined in the present disclosure is a device that may access the internet from one or more of the sources from which the internet service may be available. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, an industrial equipment, etc. These types of devices are collectively referred herein as machine type client devices.

These diverse types of client devices may access the internet service directly through one of the sources of primary internet access mentioned earlier. Alternatively, the client devices may access the internet through a local network that performs distribution of the primary internet access to the users localized in a given area. Examples of such local networks include Local Area Network (LAN) using Ethernet, Wireless LAN (WLAN) commonly known as Wi-Fi, Bluetooth™, or some other local area networking schemes. Such short range wireless networks are referred to herein as Short Range Wireless Links (SRWL). When a client device is in the proximity of a location where such a SRWL access is available, it may access the internet using the SRWL. FIG. 1 illustrates an example scenario of client devices accessing internet over a WLAN SRWL, which is connected to a traditional wire-line internet service such as DSL or cable modem. The local area where WLAN service is available is often referred to as Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to DSL or cable modem through any of the standardized interfaces such as Universal Serial Bus (USB), Ethernet, or proprietary interfaces. In some cases, the DSL or cable modem and the Hotspot AP may be part of a single physical device. In such cases the interface between the DSL or cable modem and AP may use Secure Digital Input Output (SDIO) or other suitable interface.

Client devices may also obtain internet access over mobile wireless communication networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

As the variety of client devices has increased and the demand for MB access has increased, a device known as a mobile Hotspot is commonly used. A mobile Hotspot device may include both a modem for MB access and a WLAN AP (Hotspot AP) to distribute the internet to local client devices. FIG. 2 illustrates the block diagram of an example mobile Hotspot device. As shown in FIG. 2, for the chosen example, the MB modem and the Hotspot AP may be connected to each other via one of the standard interfaces used in the industry such as USB, SDIO, or proprietary interfaces. In another mobile Hotspot example, the MB modem and the WLAN AP may be a single Integrated Circuit (IC) as shown in FIG. 3.

Some mobile Hotspot devices may serve as a single function device, i.e., they only perform the mobile Hotspot function. Such mobile Hotspots may take many different form factors such as a mobile Hotspot integrated into an automobile, a standalone device that can be carried around with or without a battery, integrated into an accessory device for a tablet, a standalone device that can be powered by a wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 4. The flow of data is as shown in FIG. 4 from the mobile broadband modem to the application processor that processes the download and upload data and interacts with the user via the display and other elements of the user interface such as audio, vibration, etc. The smartphone may also have a WLAN modem to access internet service over a Hotspot AP. When it is in the vicinity of a Hotspot AP, it may use internet service from the Hotspot as illustrated in FIG. 1. In another smartphone example, the mobile broadband modem, the WLAN AP and the Application Processor may be integrated into a single Integrated Circuit (IC) as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a machine type client device which may have only a WLAN access. In another smartphone mobile Hotspot example, the mobile broadband modem, the WLAN AP and the Application Processor may be integrated into a single IC as shown in FIG. 7.

An example of a mobile broadband network is the Long Term Evolution (LTE) from the 3rd Generation Partnership Project (3GPP). The LTE technology and its evolution are often referred to as fourth generation (4G) technologies. A client device may also use any of the previous generation technologies such as "2G", "3G" from 3GPP and other standardization bodies. A client device may also use future generation technologies for Hotspot, mobile Hotspot, and mobile networks.

Although a Hotspot or mobile Hotspot may be able to obtain internet service and distribute it to multiple client devices in a given local area, it may not be able to provide other key services that users commonly use. For example, voice calls and SMS based text messaging remain two of the most commonly used applications in client devices. A client device accessing internet through a Hotspot or mobile Hotspot may still be receiving voice calls or SMS based text messages directly through the WWAN as illustrated in FIG. 8. Four interconnected networks are shown in FIG. 8: Public Switch Telephone Network (PSTN) 802, WWAN 804, internet 806, and WLAN (Hotspot) 808. The PSTN is connected to the WWAN through the interface 820 and to the internet through the interface 822. The WWAN and internet are connected through the interface 818. The Cable modem 812 is connected to the internet through the interface 824. These interfaces may use open industry standards or may use proprietary standards. The Hotspot, in the present example, is connected to the internet using a Cable modem interface. In the present example, the Smartphone 811 is connected to the Hotspot Access Point 810 for internet service through the Cable modem 812. Simultaneously, it is also connected to the WWAN 804 for voice calls and SMS based text messaging. The Smartphone 811 may exchange SMS based text messages with the Smartphone 814 over the WWAN 804. The Smartphone 811 may have voice calls with the landline phone 816 through WWAN 804 and PSTN 802. The cordless phone 826 may access the conventional landline voice service through the cordless base 828 which in turn is connected to the PSTN 802 though the conventional landline interface 830. The coverage area 808 of the WLAN Hotspot and the coverage area 832 of the cordless base 832 may partially or fully overlap.

Although aspects of the present disclosure are illustrated using a particular type of mobile Hotspot, the disclosure may be applicable to other types of mobile Hotspot devices, some of which are listed in an earlier section of the present disclosure. In the remainder of the present disclosure a mobile Hotspot is used as an example. A mobile Hotspot may obtain the primary internet service through a cable modem, DSL or MB modem. When a mobile Hotspot is an area where it may receive primary internet service from cable modem or DSL, it may use the internet service from that source. When a mobile Hotspot is an area where it does not have access to receive primary internet service from cable modem or DSL, it may use the internet service from WWAN. When a client device is receiving internet service from a mobile Hotspot, it may still be connected to the WWAN for receiving other services such as voice calls, SMS, etc.

Typically, as shown in FIG. 9, a WWAN comprises elements such as client devices or mobile stations and one or more base stations. Other network devices may also be employed, such as a mobile switching center (not shown). As illustrated in FIG. 9, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the MS communicates with the BS in both the DL and UL directions. For instance, such communication is carried out in cellular telephone systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred herein as a "message."

Normally, certain types of system information may be required by all client devices so that they may communicate with the wireless communication network. The system information typically includes system synchronization information, system parameters, resource allocation information, paging information, etc. The wireless communication network may transmit such system information as broadcast data so that all client devices within its coverage area may be able to receive. Such information is herein referred to as "broadcast messages."

Typically in a wireless communication system a base station may group the system information and each group of system information may be transmitted as multiple broadcast messages and such broadcast messages are herein referred as system parameter messages. The system parameter messages may carry important system information without which the client device may not be able to communicate with the wireless communication network. The wireless communication network may transmit these system parameter messages at regular intervals in such a way that any client device that enters its coverage area may receive these system parameter messages and may be able to communicate with the wireless communication network at the earliest possible time. Client devices that are already in the base station's coverage area may also periodically receive these system parameter messages for possible updates. Normally a client device may store the system parameter messages in its memory for the current SBS.

Typically, in wireless communication systems, most of the system parameter messages may not change frequently. For example, some system parameter messages may change once or twice a day and some system parameter messages may not change for many days.

In some wireless communication systems, when a client device switches to a new base station due to cell reselection or handover, it may be required to receive the system parameter messages for the new SBS and certain system parameter messages for the selective list of NBSs corresponding to the new SBS.

The set of all system parameter messages broadcast by a base station is herein referred to as "base station broadcast system information." An individual block of system information message may be referred to as System Information Block (SIB). Two or more SIBs may be grouped and sent as a single System Information (SI) message. There may be different SIBs describing different groups of system parameters such as SIB Type1 (SIB1), SIB Type2 (SIB2), etc. The SI for one or more cells may be periodically updated by the network. To ensure that the client devices are using the correct version of the SI, a field referred herein as "change-mark" is generally included in the SI messages. Client devices may store the change-mark of the SIs it has decoded. If the new SI is transmitted by a cell, it may increment the change-mark to enable the client device to detect that it needs to acquire the newly updated SI. The change-mark of the newly acquired SI is then used as latest version for detecting any future changes in the SI. The change-mark field may be incremented in modulo arithmetic to keep the field bit-width to a minimum. For example, the change-mark may be incremented modulo-8 and the value may be represented by a 3-bit wide field.

A client device is considered to be in idle mode when it is not actively communicating with the network. A client device in idle mode for the most part may turn off a majority of its circuitry to reduce power consumption. This is often referred to as "sleep" state, a sub-state within the idle mode. A client device may remain in a sleep state for a long duration and may wake up at the desired time window when it expects to receive the paging messages and certain SIBs. This alternating sequence of sleep and wake-up in idle mode is referred herein as Discontinuous Reception (DRX). The sleep and wake-up sequence may follow a regular pattern and its period is often referred to as DRX cycle. The success rate for the incoming calls (e.g., mobile terminated voice calls and/or data calls) in a client device is directly related to the successful reception of paging messages. Normally, in idle mode, in addition to the reception of paging messages and SIB messages, a client device may continue to search and monitor neighbor cells.

When a client device performs a network registration procedure to get service from a cell, it decodes the system information broadcast in the cell. The client device may store such system information. The system information carries important information regarding the cell reselection criteria. Such information includes but not limited to the tracking area identity (TAI), Public Land Mobile Network Identity (PLMN ID) which uniquely identifies a particular network operator, Closed Subscriber Group Identity (CSG ID), Radio Access Technology (RAT) type, neighbor cell frequencies, etc. This information may help to decide whether a cell is a "suitable cell" for the client device to avail all the services offered by it, or the cell is an "acceptable cell" where the client device may avail only limited services such as emergency calls. The client device may have to perform the network registration procedure to get service from the network and for the network to be able to page the client device for mobile terminated (incoming) calls. The network registration procedure may be typically performed by a client device with a particular cell. A group of cells in the geographic vicinity of each other may form a registration area. A registration area may be identified based on the system information of a cell. For example, the Tracking Area Codes (TACs) of a group of cells in a registration area may be the same.

Each base station in a wireless communication network may be identified by a unique identifier referred to herein as Cell Identity (CID). The CID of a base station may become known to a client device when it decodes SI from the base station. To avoid unnecessary updates from a client device and yet ensure the ability to reach a client device at any given time, the network may organize a group of cells into a "tracking area" and use a Tracking Area Identity (TAI) to identify the various groups of cells. This is illustrated in FIG. 10 where four different tracking areas are illustrated. A cell may broadcast information about the tracking area it belongs to by including the TAI information in the system information. A client device may be required to inform the network when it begins to receive service from a cell that belongs to a tracking area that is different from the tracking area of the cells from which it was previously receiving service. The process of informing the network that the client device has begun receiving service from a cell that belongs to a new tracking area is referred herein as Tracking Area Update (TAU) procedure. With this method, a client device performs TAU only when there is a change in TAI of the cell from which it is getting service. For example, in FIG. 10, when a client device reselects from the cell with CID=1003 to the cell with CID=1007 which has the same TAI, it may not perform TAU procedure. However, when the client device reselects from the cell with CID=1007 and TAI=200 to the cell with CID=1012 and TAI=201, it may perform TAU procedure.

As long as a client device is in the same registration area, the client device may not perform network registration procedure again except that a periodic network registration update procedure may need to be performed even if the client device continues to move within the same registration area. If the client device moves to a cell which does not belong to the registration area in which the client device is registered, then the client device may perform network registration procedure to get access to and service from the network.

When a client device is in idle mode, the network may only be aware of the location of the client device at the registration area level. In order for a network to page a client device, it may need to send the paging message in all cells belonging to the same registration area. The instances for paging message transmission, known as paging occasions (POs), are usually derived based on a client device's unique identity and a DRX cycle or paging cycle. The network may transmit a paging message addressed to a specific client device in its specific paging occasion.

A base station to which the client device may be downlink synchronized and/or communicating with at any given time is referred herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called an intra-cell handover. The purpose of intra-cell handover may be that the new channel is better suited for communication than the previous channel within the same cell. Cell reselections or handovers amongst cells that use the same frequency are referred herein as intra-frequency cell reselection or handover. Cell reselections or handovers amongst cells that use different frequencies are referred to herein as inter-frequency cell reselection or handover. The different frequencies may be in the same or different frequency band. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure depends generally on whether a client device is engaged in an active communication with the wireless communication network.

When a client device is connected to a mobile Hotspot for internet service, it still may be connected to a WWAN for other services such as voice and SMS. The client device and the mobile Hotspot may be camped on the same cell of the same WWAN, and both the devices may be performing serving and neighbor cell measurements. This may be an inefficient method of measurements since most of the client devices which are connected to the mobile Hotspot may be camped on the same cell of the same WWAN.

SUMMARY

A method and apparatus are disclosed such that a mobile Hotspot may be the only device that performs the measurements on the serving and neighbor cells of the WWAN and relays the cells measurements information to the client devices over the SRWL. This may enable the client devices to avoid having to perform the measurements directly from the WWAN. As power consumption of client devices may be more critical, the relaying of the measurements information from the mobile Hotspot may be a more power efficient method for a client device.

In accordance with an aspect of the present disclosure, a method for communication of measurement information in a wireless communication network may include: controlling, by a processing device, at a hotspot device, receiving a request from a client device to perform measurements on at least one of a serving cell or at least one neighbor cell of the client device indicated on a list transmitted with the request; determining a neighbor cell measurement schedule for the hotspot device; determining whether the measurements are performable by the hotspot device on at least one given cell indicated in the list; and when the measurements are determined to be performable for at the least one given cell, communicating to the client device a positive acknowledgement with an indication of each first cell indicated in the list for which the measurements are determined to be performable, and when the measurements are determined not to be performable on any cell indicated in the list, communicating to the client device a negative acknowledgement with an indication the measurements are determined to be not performable for any of the cells indicated in the list.

In one alternative, the list may indicate at least one intra-frequency, inter-frequency or inter-Radio Access Technology (RAT) cell.

In one alternative, the list may indicate only at least one given Radio Access Technology (RAT) type or at least one given frequency band for which the client device requests the hotspot device to perform the measurements.

In one alternative, the method may include controlling, by the processing device, at the hotspot device, entering into a Cellular Neighbor Measurement Broadcast over Short Range Wireless Links (SRWL) (CNMBOS) mode with the client device, when the positive acknowledgement is communicated.

In one alternative, the method may include controlling, by the processing device, at the hotspot device, when the hotspot device enters the CNMBOS mode, performing at least one periodic measurements on each first cell.

In one alternative, the method may include controlling, by the processing device, at the hotspot device, transmitting results of the at least one periodic measurements to the client device as a measurement report indicating identifying details for each of the first cells, in which the details include at least one of Cell Identity (CID), frequency, or Radio Access Technology (RAT) type, and at least one measurement metric of Received Signal Strength Indicator (RSSI), Reference Signal Received power (RSRP), Reference Signal Received Quality (RSRQ) or timing offset.

In one alternative, a measurement metric type for the at least one periodic measurements may be different for different RAT types.

In one alternative, the method may include: controlling, by the processing device, at the hotspot device, negotiating a measurement configuration for performing the at least one periodic measurements, wherein the configuration includes at least one of periodicity, a filtering coefficient or reporting criteria; and determining whether a given measurement configuration is acceptable, based on the neighbor cell measurement schedule of the hotspot device.

In one alternative, the method may include: controlling, by the processing device, at the hotspot device, performing the at least one period measurements using a default measurement configuration.

In one alternative, the default measurement configuration may be once every 200 ms without any filtering, and wherein the at least one periodic measurements are reported to the client device when a threshold is exceeded.

In one alternative, the threshold may be exceeded when the RSRP is determined to be >−120 dBm.

In one alternative, the method may include controlling, by the processing device, at the hotspot device, when the at least one periodic measurements are being performed, detecting at least one other neighbor cell other than a given cell indicated in the list and communicating details of measurements performed for the at least one other neighbor cell in a measurements report indicating identifying details for each of the first cells based on the at least one periodic measurements transmitted to the client device.

In one alternative, the method may include: controlling, by the processing device, at the hotspot device, determining, from the at least one periodic measurements, a single best cell, $C_m$, of the first cells having a first Radio Access Technology (RAT) type and a first frequency as a timing reference for determining relative time offset (RTO) of all other of the first cells having the same first RAT type and the first frequency; determining, and reporting to the client device in the measurements report, the RTOs for each of the other of the first cells, in which the measurement reports indicates an identity of the cell $C_m$.

In one alternative, a current serving cell, $C_s$, of the client device may be the cell $C_m$ and the measurements report may indicate timing offset of given cells of the first cells with respect to the current serving cell $C_s$.

In one alternative, the method may include controlling, by the processing device, at the hotspot device, when the SRWL through which the hotspot device and the client device are connected allows time synchronization of the hotspot device and the client device, using synchronized time as a common time reference for reporting relative time offset (RTOs) for all of the first cells from all Radio Access Technology (RAT) types and frequencies.

In one alternative, when the SWRL is a Wireless LAN (WLAN), a beacon signal of the WLAN may be used as a time reference for reporting the RTOs for the first cells.

In one alternative, the method may include: controlling, by the processing device, at the hotspot device, at any time communicating to the client device that the hotspot device is about to exit CNMBOS mode, and before exiting the CNMBOS mode at the hotspot device, sending a most recent neighbor measurements report to the client device based on the at least one periodic measurements.

In one alternative, the method may include controlling, by the processing device, at the hotspot device, entering the CNMBOS mode individually with a plurality of first client devices including the client device simultaneously.

In one alternative, a first plurality of the first client devices and the hotspot device may be camped on to a same cell of a same Radio Access Technology (RAT) type and frequency of a same Wireless Wide Area Network (WWAN).

In one alternative, the method may include controlling, by the processing device, at the hotspot device, at least one of (i) performing a single set of measurements, organizing a measurements report as a single composite report and transmitting the composite report as a broadcast message addressing all the first client devices, or (ii) performing more than one set of measurements, organize multiple measurements reports and transmitting the multiple measurement reports at least one of (a) as broadcast messages addressing all the first client devices or (b) to respective individual ones of the first client devices using respective dedicated messages.

In one alternative, the method may include: controlling, by the processing device, at the hotspot device, entering the CNMBOS mode autonomously, without negotiating with any given client device, and starting broadcasting measurements reports for a currently camped serving cell of the hotspot device and all neighbor cells detected as belonging to a same network.

In one alternative, the measurements reports may be broadcast whenever at least one given client device is connected to the hotspot device over the SRWL.

In one alternative, the method may include controlling, by the processing device, at the hotspot device, reporting the measurements through an application based on a peer-to-peer protocol executed in the hotspot device and the client device, in which the peer-to-peer protocol based application communicates through a logical channel provided by a given SRWL used between the hotspot device and the client device, is independent of the given SRWL and is achieved through a virtual communication port established in the hotspot device and the client device.

In one alternative, when the given SRWL is a Wireless LAN (WLAN), the peer-to-peer protocol may be a Transmission Control Protocol (TCP) and the Internet Protocol (IP) TCP/IP socket communication between the hotspot device and the client device.

In one alternative, the method may include: controlling, by the processing device, at the hotspot device, deciding to create a new physical or logical channel as a Cellular Neighbor Cell Measurement Broadcast Channel (CNCMBC), based on negotiation between the hotspot device and the client device in which the new physical or logical channel for the CNMBOS mode related information exchange is dedicated, in which the CNCMBC has a periodicity and time slot in which to unicast or broadcast neighbor cell measurements reports from the hotspot device, and in which the CNCMBC is configured for monitoring by the client device according to a pre-defined periodicity and time slot to receive the neighbor cell measurements report from the hotspot device.

In one alternative, the method may include, when the hotspot device includes a plurality of M receiver/decoder circuits, controlling, by the processing device, at the hotspot device making the measurements in parallel even for overlapping measurement windows from a plurality of N cells of a same or different frequencies and Radio Access Technology (RAT) types, in which M and N are the same or different.

In one alternative, the method may include, when the hotspot device is equipped with more than one source as a primary source of internet, controlling, by the processing device, at the hotspot device, using a first primary source to provide internet service and a second primary source only for performing measurements on at least one given cell of a Wireless Wide Area Network (WWAN).

In one alternative, the more than one source may include a cable modem and a WWAN modem.

In one alternative, the method may include when (i) the hotspot device and the client device are in the CNMBOS mode, (ii) a cell change occurs in at least one of the hotspot device or the client device and (iii) the hotspot device is not able to continue in the CNMBOS mode with the client device, controlling, by the processing device, at the hotspot device, sending an Exit CNMBOS mode Request to, and exiting the CNMBOS mode with, the client device.

In one alternative, the method may include: controlling, by the processing device, at the hotspot device, receiving a Wireless Wide Area Network (WWAN) Measurements Request message from the client device, in which the WWAN Request message indicates a request indicating at least one updated neighbor cell on which to make measurements, in which the WWAN Request message is transmitted from the client device based on a determination, subsequent to the Exit CNMBOS mode Request being sent, by the client device that the CNMBOS mode can be entered based on another cell reselection being performed at the client device; and controlling, by the processing device, at the hotspot device, based on a determination that the hotspot device is able to support the CNMBOS mode for the client device for the at least one updated neighbor cell, transmitting a WWAN Measurements Confirm message to the client device.

In one alternative, the method may include: when (i) the hotspot device and the client device are in the CNMBOS mode, (ii) at least one of given cell of the cells indicated in the list is changed, (iii) the hotspot device determines the measurements are performable on at least one cell indicating on an updated list including at least one updated neighbor or serving cell transmitted from the client device, controlling, by the processing device, at the hotspot device transmitting a WWAN Measurements List Update Notification message to the client device about each cell of the updated list; and receiving a positive acknowledgement from the client device including a Continue CNMBOS mode Confirm message, in which the Continue CNMBOS mode Confirm message is transmitted by the client device when a determination at the client device is that the measurements are performable by the hotspot device on at least one cell from the updated list, wherein, following reception of the positive acknowledgment, the client device and the hotspot device operate in the CNMBOS mode.

In one alternative, the method may include when the hotspot device determines the measurements are not performable on any cell of the updated list, controlling, by the processing device, at the hotspot device, transmitting a negative acknowledgment to the client device indicating denial of a measurements request in its entirely.

In one alternative, the method may include: when (i) the hotspot device and the client device are in the CNMBOS mode, (ii) a change in the list is determined, and (iii) the hotspot device is not able to continue in the CNMBOS mode with the client device, controlling, by the processing device, at the hotspot device, transmitting an Exit CNMBOS mode Request to the client device, receiving an Exit CNMBOS mode Confirm from the client device transmitted responsive to the Exit CNMBOS mode Request, and exiting the CNMBOS mode with the client device.

In one alternative, the method may include: when (i) the hotspot device and the client device are in the CNMBOS mode and (ii) at least one of (a) system information (SI) for a serving cell of the hotspot device is changed or (b) cell reselection is performed at the hotspot device, controlling, by the processing device, at the hotspot device, transmitting an Exit CNMBOS mode Request to, and exiting the CNMBOS mode with, the client device, when the hotspot device is not able to continue in the CNMBOS mode with the client device.

In one alternative, the method may include: when, subsequent to the exiting the CNMBOS mode with the client device, the SI of serving cell of the hotspot device is updated by the network, controlling, by the processing device, at the hotspot device, transmitting a Wireless Wide Area Network (WWAN) Measurements Confirm message to the client device indicating the hotspot device is able to resume the measurements for the client device; and receiving from the client device a WWAN Measurements Request with an updated list of neighbor cells on which to perform the measurements; when a determination is the hotspot device is able to support the CNMBOS mode for the client device for at least one updated cell indicated in the updated list, transmitting a WWAN Measurements Confirm message and an Enter CNMBOS mode Request message to the client device, and receiving an Enter CNMBOS mode Response message from the client device.

In one alternative, the method may include: when a determination is the hotspot device is not able to continue to perform the measurements as indicated by the positive acknowledgement, controlling, by the processing device, at the hotspot device, transmitting a Wireless Wide Area Network (WWAN) Measurements List Update Notification message to the client device with an updated neighbor cell list indicating at least one updated neighbor cell for the which measurements for the client device are performable at the hotspot device; and receiving from the client device, transmitted by the client device responsive to the WWAN Measurements List Update Notification message, a Continue CNMBOS mode Confirm message indicating the hotspot device to continue in the CNMBOS mode, in which the client device performs measurements for at least one second cell of the first cells not on the updated list.

In one alternative, in which the hotspot device may not be able to continue to perform the measurements indicated in the positive acknowledgement when an operating mode transitions from an active connection to an idle mode.

In one alternative, the method may include controlling, by the processing device, receiving, at the hotspot device, an Exit CNMBOS mode Confirm message from the client device indicating the client device is exiting the CNMBOS mode, in which the Exit CNMBOS mode Confirm message is transmitted when the client device determines that measurement for the updated neighbor cell list is not serving a purpose of the CNMBOS mode, exits the CNMBOS mode with the hotspot device and starts to perform neighbor cell measurements.

In one alternative, the method may include controlling, by the processing device, at the hotspot device, monitoring system information (SI) and transmitting to the updated SI to the client device; and receiving an updated list of neighbor cells from the client device, in which the updated list is determined based on the updated SI; and determining whether the CNMBOS mode can be continued for the updated list of neighbor cells.

In accordance with an aspect of the present disclosure, an apparatus for communication of measurement information in a wireless communication network may include: circuitry configured to control, at a hotspot device, receiving a request from a client device to perform measurements on at least one of a serving cell or at least one neighbor cell of the client device indicated on a list transmitted with the request; determining a neighbor cell measurement schedule for the hotspot device; determining whether the measurements are performable by the hotspot device on at least one given cell indicated in the list; and when the measurements are determined to be performable for at the least one given cell, communicating to the client device a positive acknowledgement with an indication of each first cell indicated in the list for which the measurements are determined to be performable, and when the measurement are determined not to be performable on any cell indicated in the list, communicating to the client device a negative acknowledgement with an indication the measurements are determined to be not performable for any of the cells indicated in the list.

In accordance with an aspect of the present disclosure, a wireless communication device may include a receiver to receive a wireless communication; and a processing device configured for communication of measurement information in a wireless communication network. The processing device may be configured to control: receiving a request from a client device to perform measurements on at least one of a serving cell or at least one neighbor cell of the client device indicated on a list transmitted with the request; determining a neighbor cell measurement schedule for the communication t device; determining whether the measurements are performable by the communication t device on at least one given cell indicated in the list; and when the measurements are determined to be performable for at the least one given cell, communicating to the client device a positive acknowledgement with an indication of each first cell indicated in the list for which the measurements are determined to be performable, and when the measurement are determined not to be performable on any cell indicated in the list, communicating to the client device a negative acknowledgement with an indication the measurements are determined to be not performable for any of the cells indicated in the list.

In accordance with an aspect of the present disclosure, a method for communication of measurement information in a wireless communication network may include: controlling, by a processing device, at a client device, transmitting to a hotspot device a request to perform measurements on at least one of a serving cell or at least one neighbor cell of the client device indicated on a list transmitted with the request; and receiving, at the client device, a communication from the hotspot device based on a determination at the hotspot device, using a neighbor cell measurement schedule for the hotspot device, whether measurements are performable by the hotspot device on at least one given cell indicated in the list, in which, when the measurements are determined to be performable for the at least one given cell, the communication includes a positive acknowledgement with an indication of each first indicated in the list for which the measurements are determined to be performable, and when the measurements are determined not to be performable on any cell indicated in the list, the communication includes a negative acknowledgement with an indication the measurements are determined to be not performable for any of the cell indicated in the list.

In one alternative, the method may include controlling, by the processing device, at the client device entering into a Cellular Neighbor Measurement Broadcast over Short Range Wireless Links (SRWL) (CNMBOS) mode with the hotspot device, when the communication includes the positive acknowledgement.

In one alternative, the method may include controlling, by the processing device, at the client device, when at least one periodic measurements is performed on each of the first cells at the hotspot device, receiving details of the measurements performed for the at the at least one periodic measurements in a measurements report transmitted from the hotspot device, and cell reselection or cell selection based on at least one of Received Signal Strength Indicator (RSSI), Reference Signal Received power (RSRP), Reference Signal Received Quality (RSRQ) and relative time offset (RTO) information indicated in the measurements report.

In one alternative, the method may include controlling, by the processing device, at the client device, when the measurement reports is received from the hotspot device, cell detection for one detected cell, $C_n$, in the measurements report, when the cell $C_n$ is detected, synchronizing to the cell $C_n$ for cell reselection or cell selection, and when the cell $C_n$ is synchronized to, mapping a neighbor cell RTO from the measurements report to RTOs relative to the cell $C_n$ on which the client device is currently camped.

In one alternative, the method may include controlling, by the processing device, at the client device, when the client device is can no longer maintain the SRWL with, or disconnects from, the hotspot device, exiting the CNMBOS mode and starting neighbor cell measurements at the client device according to a predetermined normal Radio Access Technology (RAT) type specific measurement procedures.

In one alternative, the client device may be preconfigured with at least one of a set of Radio Access Technology (RAT) types, frequency or given cell for which the client device is expected to perform the measurements.

In one alternative, the method may include: controlling, by the processing device, at the client device, when the client device is disconnected from the hotspot device and unable to find another hotspot device in a vicinity of the client device, starting neighbor cell measurements from a Wireless Wide Area Network (WWAN).

In one alternative, the method may include: controlling, by the processing device, at the client device, when the client device is in idle mode or in active communication with a Wireless Wide Area Network (WWAN), requesting the hotspot device to perform neighbor cell measurements.

In one alternative, the method may include: controlling, by the processing device, at the client device, when the client device is disconnected from the hotspot device and unable to find another hotspot device in a currently location of the client device, starting neighbor cell measurements at the client device.

In one alternative, the method may include: controlling, by the processing device, at the client device, when the client device enters the CNMBOS mode, turning off a Radio Frequency (RF) receiver of a cellular modem of, and entering a power save state at, the client device, based on determination that a neighbor cell measurement does not need to be performed at the client device.

In one alternative, the method may include: controlling, by the processing device, at the client device, when a change of at least one given cell indicated in the list is detected at the client device, transmitting a Wireless Wide Area Network (WWAN) Measurements Update Request message to the hotspot device, to cause a change in scheduling of measurements at the hotspot device.

In one alternative, the method may include: controlling, by the processing device, at the client device, performing measurements for a given cell of the first cells after entering into the CNMBOS mode; and estimating, and compensating for, a difference in the measurements by the client device and the measurements by the hotspot device.

In one alternative, the method may include: controlling, by the processing device, at the client device, when a predetermined number of WWAN Measurements Report messages are received by the client device in the CNMBOS mode, for each cell, comparing the measurements of the client device against an average of values received in the WWAN Measurements Report and estimating a compensation value for each measurement metric of the measurements of the client device; and stopping performing the measurements by the client device and starting using information of a report of the measurements from the hotspot device in combination with the compensation values for at least one of a cell reselection or handover decision.

In one alternative, the measurements of the client device may include at least one metric of Received Signal Strength Indicator (RSSI), Reference Signal Received power (RSRP) or Reference Signal Received Quality (RSRQ).

In one alternative, the estimating the compensation value for each measurement metric of the measurements of the client device may be performed periodically for updating the compensation values.

In accordance with an aspect of the present disclosure, an apparatus for communication of measurement information in a wireless communication network may include: circuitry configured to control, at a client device, transmitting to a hotspot device a request to perform measurements on at least one of a serving cell or at least one neighbor cell of the client device indicated on a list transmitted with the request; and receiving, at the client device, a communication from the hotspot device based on a determination at the hotspot device, using a neighbor cell measurement schedule for the hotspot device, whether measurements are performable by the hotspot device on at least one given cell indicated in the list, in which, when the measurements are determined to be performable for the at least one given cell, the communication includes a positive acknowledgement with an indication of each first indicated in the list for which the measurements are determined to be performable, and when the measurements are determined not to be performable on any cell indicated in the list, the communication includes a negative acknowledgement with an indication the measurements are determined to be not performable for any of the cell indicated in the list.

In accordance with an aspect of the present disclosure, a wireless communication device may include a receiver to receive a wireless communication; and a processing device configured for communication of measurement information in a wireless communication network. The processing device may be configured to control: transmitting to a hotspot device a request to perform measurements on at least one of a serving cell or at least one neighbor cell of the communication device indicated on a list transmitted with the request; and receiving, at the communication device, a communication from the hotspot device based on a determination at the hotspot device, using a neighbor cell measurement schedule for the hotspot device, whether measurements are performable by the hotspot device on at least one given cell indicated in the list, in which, when the measurements are determined to be performable for the at least one given cell, the communication includes a positive acknowledgement with an indication of each first indicated in the list for which the measurements are determined to be performable, and when the measurements are determined not to be performable on any cell indicated in the list, the communication includes a negative acknowledgement with an indication the measurements are determined to be not performable for any of the cell indicated in the list.

DETAILED DESCRIPTION

Figure 1:
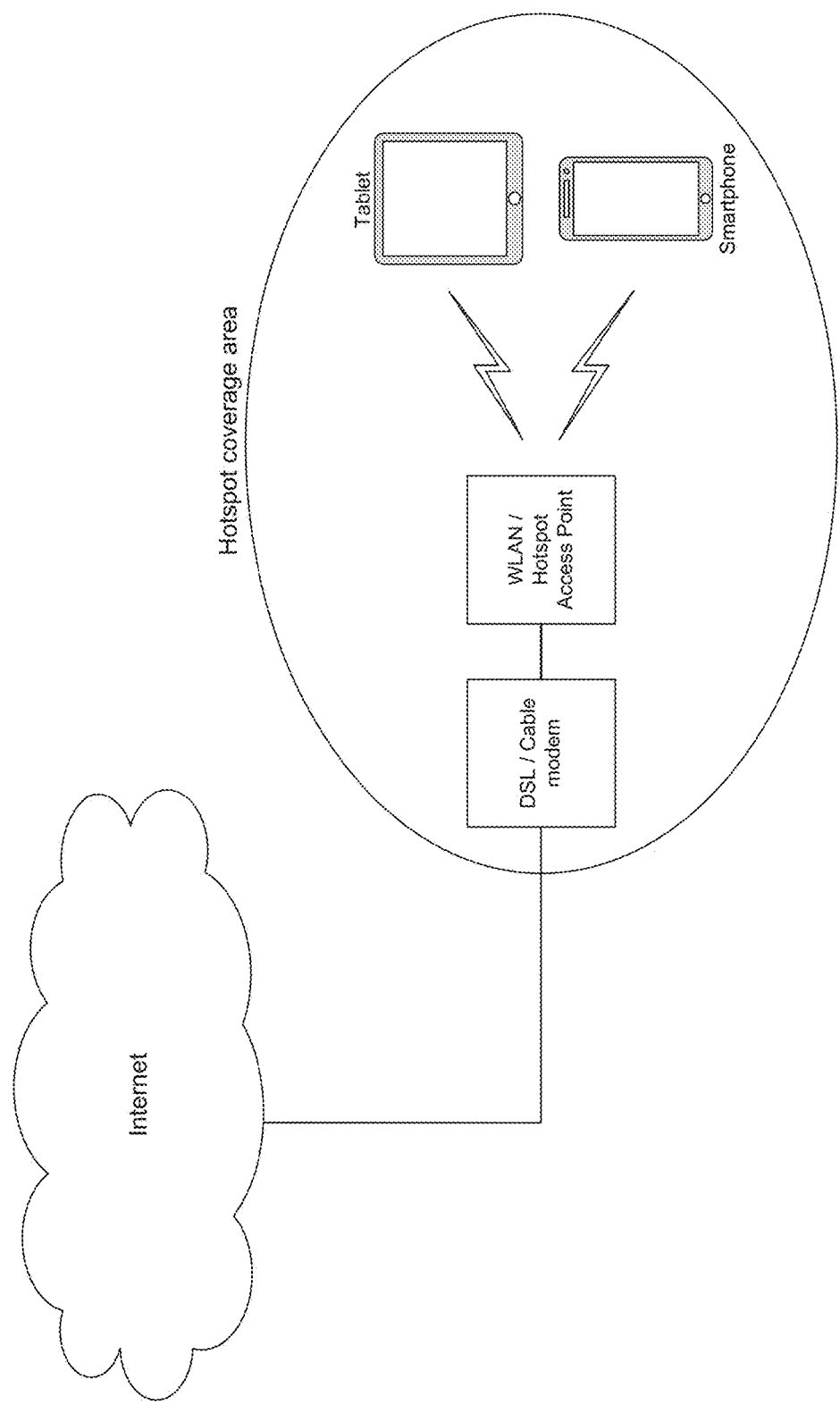
FIG. 1 illustrates an example scenario of internet access using WLAN network over a traditional wire-line internet service.
Figure 2:
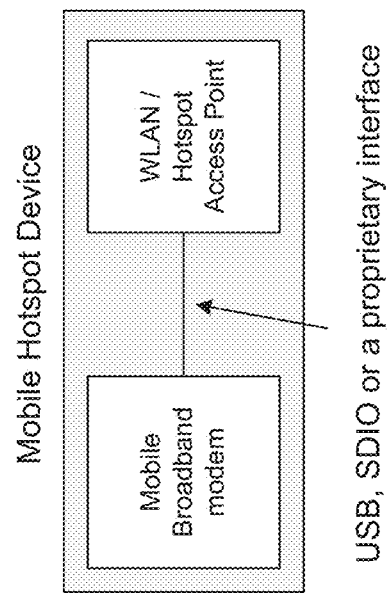
FIG. 2 illustrates a high level block diagram of a mobile Hotspot device.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although aspects of the present disclosure are illustrated using a particular type of mobile Hotspot, the disclosure may be applicable to other types of Hotspots.

Although the aspects of the present disclosure may use the 3GPP LTE wireless communication system as an example for a WWAN used in a mobile Hotspot, the aspects described herein are applicable to other WWAN such as 3GPP Wideband Code Division Multiple Access (WCDMA), High Speed Packet Access (HSPA), Global System for Mobile communication (GSM), General Packet Radio Service (GPRS), Code Division Multiple Access (CDMA), etc. Similarly, although the WLAN may be used as an example SRWL for the mobile Hotspot, other SRWL such as Bluetooth™ may be used by a mobile Hotspot.

The types of client devices connected to a mobile Hotspot may vary. For example, a standard laptop or a desktop Personal Computer (PC), a tablet, etc. may be connected for internet service. Another type device, referred to as machine type device, may be deeply embedded devices inside appliances such as a refrigerator, a washer, a dryer, etc. which may use internet service. This type of devices may have different service requirements such as they may be more delay tolerant than other types of client devices. Another type of device may be a smartphone which may use multiple services such as internet, voice calls, SMS, etc. from the mobile Hotspot. Another type of device may be a cordless phone inside a home or office which may connect to the mobile Hotspot only for voice calls.

The mobile Hotspot and client device may communicate through the SRWL and may exchange their WWAN capabilities such as the RAT types supported by them as disclosed in U.S. patent application Ser. No. 15/233,488 filed Aug. 10, 2016 ("'488 application"), incorporated by reference herein. For example, the mobile Hotspot and client device may be supporting one or more of the following WWAN: CDMA, GSM, LTE, GPRS, etc.

The mobile Hotspot and the client device may communicate with each other the current WWAN identity (i.e., PLMN ID), the RAT types, the CID, the TAI, the frequency of the channel, default DRX cycle or paging cycle, etc. for the cell they are camped on as disclosed in the '488 application. If there is more than one client device connected to the mobile Hotspot, each client device may communicate to the mobile Hotspot the information about the cell it is camped on.

According to an aspect of the present disclosure, a client device may request to the mobile Hotspot to perform measurements on client device's serving and/or neighbor cells. According to an aspect of the present disclosure, a client device may send a list of intra-frequency, inter-frequency, and inter-RAT cells on which it requests the mobile Hotspot to make measurements. Alternatively, according to an aspect of the present disclosure, the client device may specify only the RAT types and the frequency bands for which it may request the mobile Hotspot to make neighbor cell measurements.

According to an aspect of the present disclosure, the mobile Hotspot may evaluate its own neighbor cell measurements schedule and may determine whether it can perform measurements on one or more, including all, of the cells included in the list provided by the client device. After making the determination, the mobile Hotspot may communicate to the client device about the list of cells on which the mobile Hotspot may be able to make measurements. According to an aspect of the present disclosure, if the mobile Hotspot can make measurements on at least one of the cells from the list of cells provided by the client device, then the mobile Hotspot may send to the client device a positive acknowledgement along with the list of cells on which it can make the measurements. Upon reception of the acknowledgment from the mobile Hotspot, both the client device and the mobile Hotspot may enter Cellular Neighbor Measurement Broadcast over SRRWL (CNMBOS) mode. According to an aspect of the present disclosure, the mobile Hotspot may determine that it may be unable to perform measurements on any of the cells in the list provided by the client terminal and it may deny the measurements request entirely by sending a negative acknowledgment.

According to an aspect of the present disclosure, after the mobile Hotspot enters CNMBOS mode, it may perform periodic measurements on the agreed list of cells. According to an aspect of the present disclosure, after making the measurements on the agreed list of cells, the results may be organized in a measurements report and it is transmitted to the client device. The measurements report may include the identifying details of each cell such as CID, frequency, RAT type, etc. and the actual measurement metrics such as Received Signal Strength Indicator (RSSI), Reference Signal Received power (RSRP), Reference Signal Received Quality (RSRQ), timing offsets, etc. The measurement metric type may be different for different RAT types.

According to an aspect of the present disclosure, the mobile Hotspot and the client device may negotiate the configuration for performing the measurements. For example, the configuration for making the measurements may include the periodicity, filtering coefficients, reporting criteria, etc. The mobile Hotspot may evaluate its own neighbor cell measurements schedule and may determine whether it can accept one of the measurement configurations.

Alternatively, according to an aspect of the present disclosure, the mobile Hotspot and the client device may use default values for the measurement configuration, e.g., perform measurements once every 200 ms without any filtering and report the measurement only if it exceeds a certain threshold, e.g., when RSRP>−120 dBm.

According to an aspect of the present disclosure, during the process of making measurements, the mobile Hotspot may detect neighbor cells that may not be part of the list of cells requested by the client device. According to an aspect of the present disclosure, the mobile Hotspot may include the newly detected and measured neighbor cells details in the measurements report transmitted to the client device.

According to an aspect of the present disclosure, the mobile Hotspot may keep one best cell, e.g., cell $C_m$, of a particular RAT type and frequency as a timing reference for determining the relative time offset (RTO) of all the other detected cells in the same RAT type and frequency. According to an aspect of the present disclosure, the mobile Hotspot may determine and report the RTOs for all the detected cells in the measurements report it may send to the client device. The measurements report may include the identity of the cell that was used as a timing reference for the measurements report. According to an aspect of the present disclosure, the mobile Hotspot may keep the client device serving cell, say $C_s$, as the cell for timing reference and report the other cell timing offset with respect to that of the current serving cell $C_s$ of the client device.

According to an aspect of the present disclosure, if the SRWL through which the mobile Hotspot and the client device are connected allows them to be time synchronized, the mobile Hotspot may use the synchronized time as a common time reference for reporting the RTOs for all detected neighbor cells from all RAT types and frequencies. For example, if the WLAN is used as SRWL, the beacon signal of the WLAN may be used a time reference for reporting the RTO for all the detected cells. The client device may use the measurements report that may include the RSSI, RSRP, RSRQ, and the RTO for cell reselection or cell selection purposes.

According to an aspect of the present disclosure, after receiving the measurements report from the mobile Hotspot, the client device may prefer to do its own cell detection for one of the detected cells, e.g., cell $C_n$, reported by the mobile Hotspot in the measurements report. According to an aspect of the present disclosure, after detecting the cell $C_n$, the client device may synchronize to that cell for cell reselection or cell selection. According to an aspect of the present disclosure, after synchronizing to the cell $C_n$, the client device may map the neighbor cell RTOs from the measurement report received from the mobile Hotspot to the RTOs relative to the cell $C_n$ on which it is currently camped.

According to an aspect of the present disclosure, if a client device goes out of range and can no longer maintain the SRWL with the mobile Hotspot, the client device may exit CNMBOS mode and may start neighbor cell measurements on its own as per normal RAT type specific measurement procedures.

According to an aspect of the present disclosure, if a client device disconnects with the mobile Hotspot, then the client device may exit CNMBOS mode and may start neighbor cell measurements on its own as per normal RAT type specific measurement procedures.

According to an aspect of the present disclosure, at any point of time, the mobile Hotspot may communicate to the client device that it is about to exit CNMBOS mode and before exiting the CNMBOS mode the mobile Hotspot may send the most recent neighbor measurements report to the client device.

Multiple client devices may be connected to the mobile Hotspot over the SRWL. According to an aspect of the present disclosure, the mobile Hotspot may enter CNMBOS mode individually with multiple client devices simultaneously. In many cases, multiple client devices and the mobile Hotspot may be camped on to the same cell of the same RAT type and frequency of the same WWAN. According to an aspect of the present disclosure, in some scenarios, the mobile Hotspot may perform a single set of measurements and organize the measurements report as a single composite report and may send it as a broadcast message addressing all the client devices that have entered into the CNMBOS mode with it. This method enables a single set of measurements to be used for multiple client devices. According to an aspect of the present disclosure, in some scenarios, the mobile Hotspot may perform more than one set of measurements and organize them in multiple measurements reports and may send them as broadcast messages addressing all the client devices that have entered into the CNMBOS mode with it. Alternatively, the measurements reports may be sent to respective individual client devices using dedicated messages (unicast).

According to an aspect of the present disclosure, a mobile Hotspot may enter CNMBOS mode autonomously, without negotiating with any client device, and may start broadcasting neighbor cell measurements reports for its currently camped serving cell and all the detected neighbor cells belonging to the same network. According to an aspect of the present disclosure, the mobile Hotspot may only broadcast the measurements reports whenever there is at least one client device connected to it over SRWL.

According to an aspect of the present disclosure, the client device may be preconfigured with a set of RAT types, frequencies, and/or cells for which it may be expected to do neighbor cell measurements.

According to an aspect of the present disclosure, the mobile Hotspot may report the neighbor cell measurements through an application based on a peer-to-peer protocol which may run in the mobile Hotspot and in the client device. The peer-to-peer protocol based application may communicate through a logical channel provided by the SRWL that is used between the mobile Hotspot and the client device. The peer-to-peer protocol based application may be independent of the particular SRWL used and it may be achieved through a virtual communication port established in both the mobile Hotspot and in the client device. For example, in case of WLAN, the peer-to-peer protocol may be a TCP/IP socket communication between the mobile Hotspot and the client device.

According to an aspect of the present disclosure, the mobile Hotspot may decide to create a new physical or logical channel, namely, Cellular Neighbor Cell Measurement Broadcast Channel (CNCMBC) where the mobile Hotspot and the client device may pre-negotiate and dedicate that physical or logical channel for the CNMBOS mode related information exchange. The CNCMBC may be defined with a periodicity and time slot where the mobile Hotspot may unicast or broadcast the neighbor cell measurements reports and the client devices may monitor the CNCMBC on a pre-defined agreed upon periodicity and time slot to receive the neighbor cell measurements report from the mobile Hotspot.

According to an aspect of the present disclosure, when a client device is disconnected from a mobile Hotspot, and if the client device is unable to find another mobile Hotspot in its vicinity, then the client device on its own may start making neighbor cell measurement from the WWAN.

According to an aspect of the present disclosure, the client device may request the mobile Hotspot to perform neighbor cell measurements when the client device is in idle mode as well as when it is in active communication with the WWAN.

Figure 3:
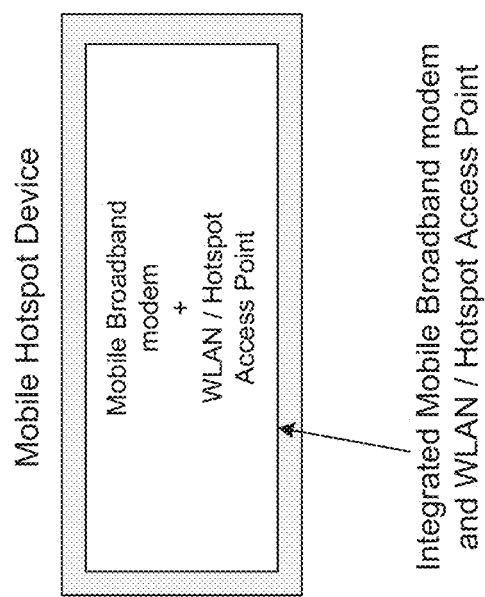
FIG. 3 illustrates a high level block diagram of an example mobile Hotspot device with an integrated mobile broadband modem and WLAN Access Point.
Figure 4:
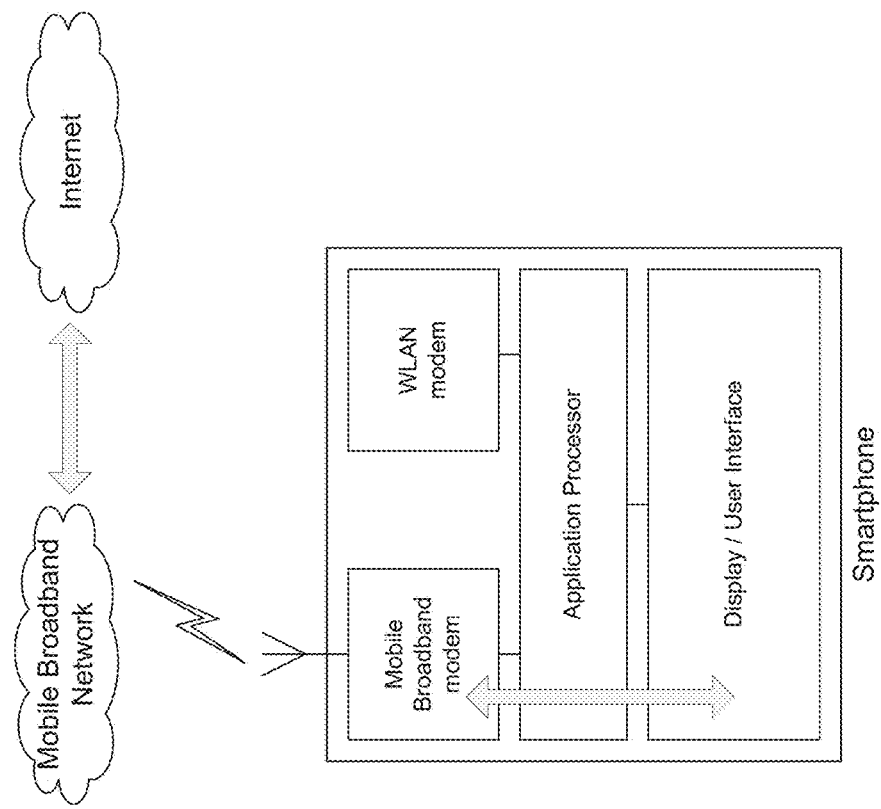
FIG. 4 illustrates a use case of internet access over a mobile broadband network by a smartphone client device.
Figure 5:
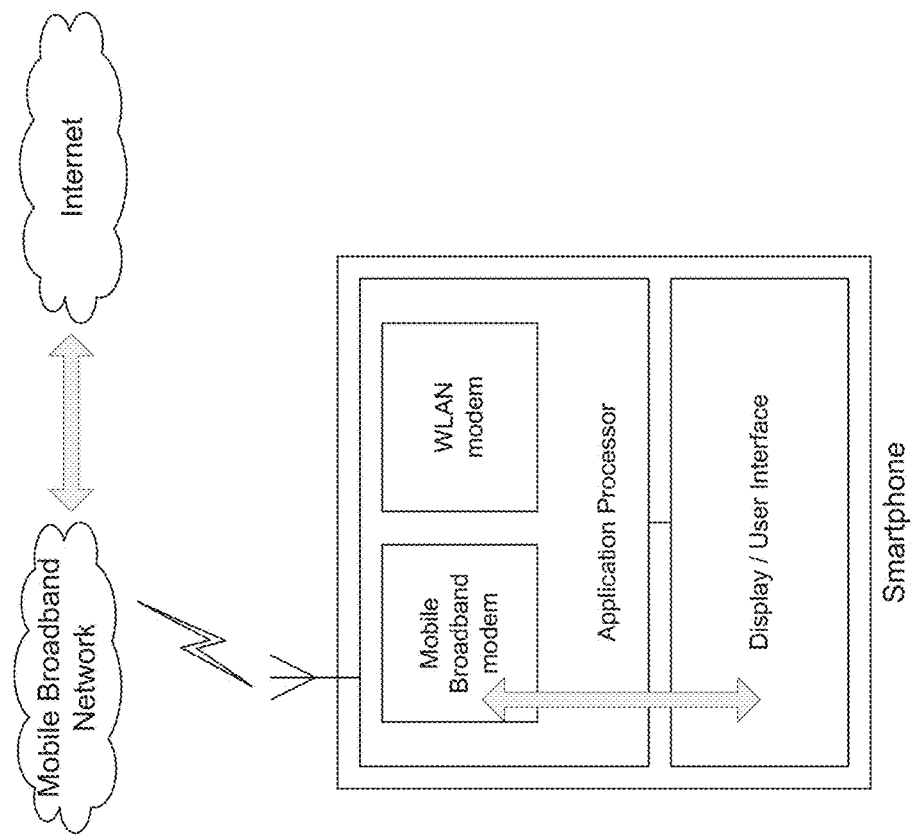
FIG. 5 illustrates a use case of internet access over a mobile broadband network by a smartphone client device with an integrated mobile broadband modem, WLAN Access Point, and Application Processor.
Figure 6:
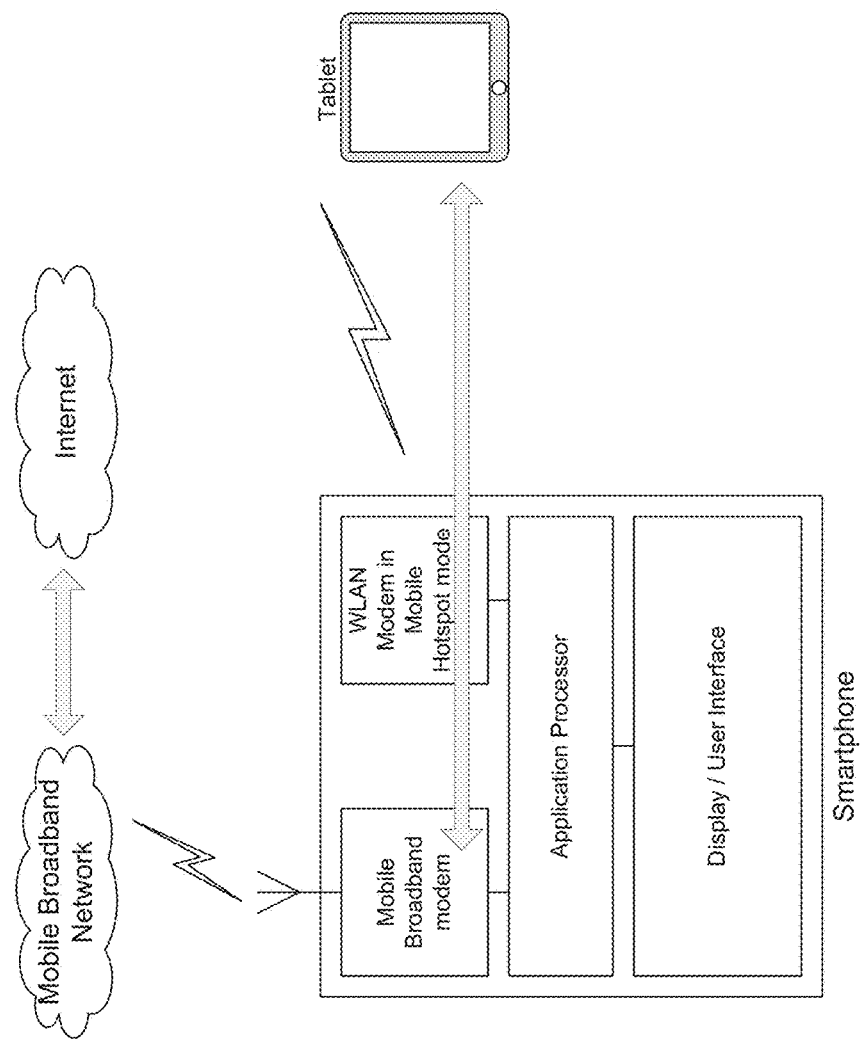
FIG. 6 illustrates a use case of internet access over a WLAN network by a client device through a smartphone operating in mobile Hotspot mode.
Figure 7:
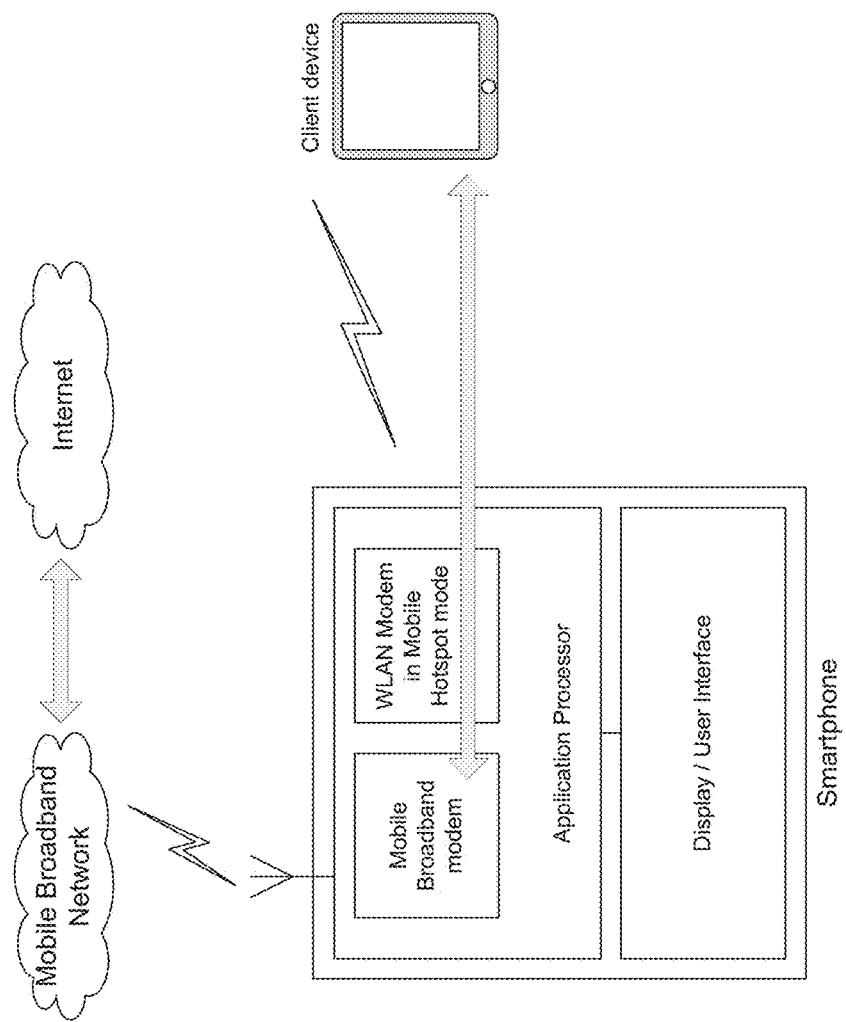
FIG. 7 illustrates a use case of internet access over a WLAN network by a client device through a smartphone operating in mobile Hotspot mode with an integrated mobile broadband modem, WLAN Access Point, and Application Processor.
Figure 8:
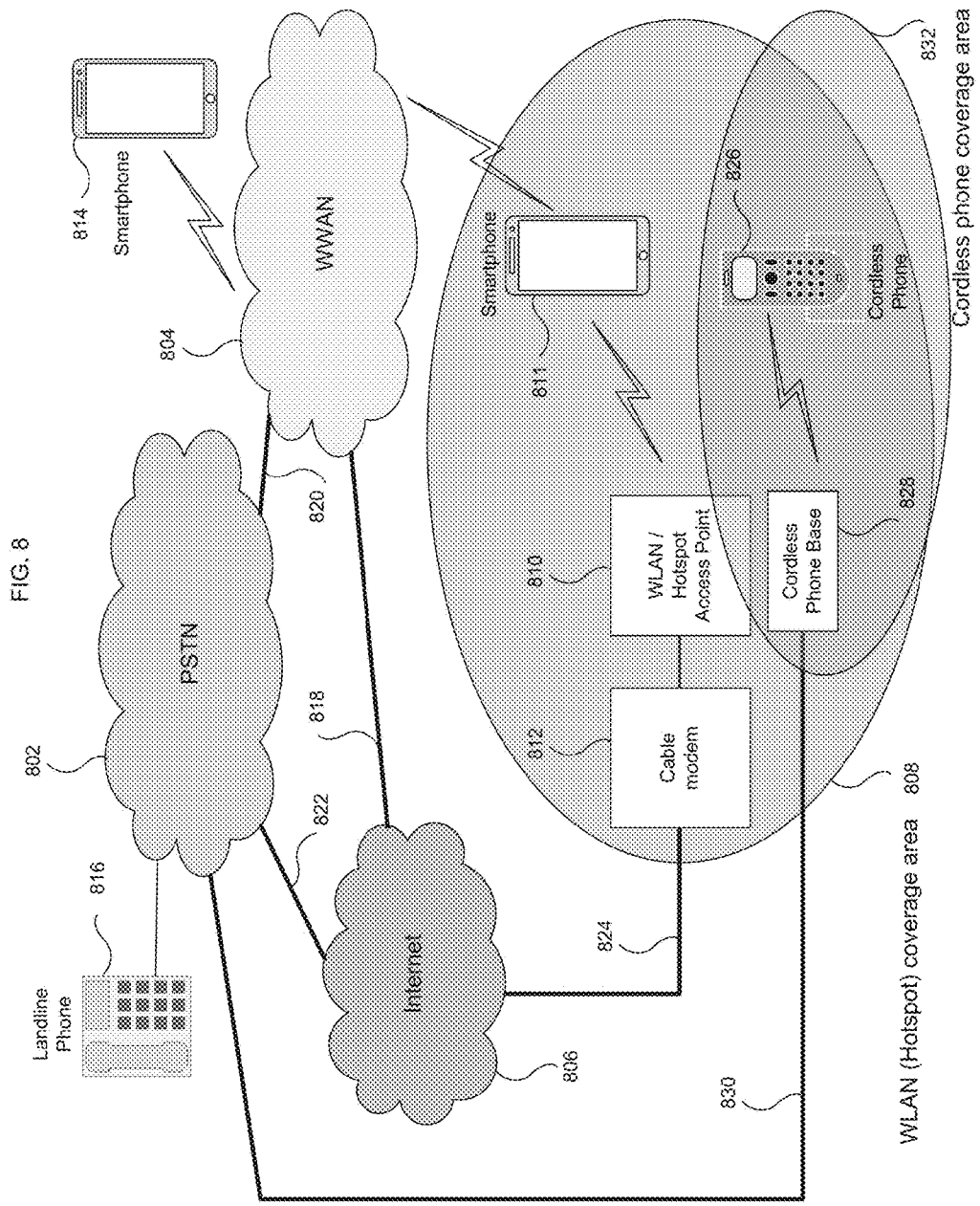
FIG. 8 illustrates a use case of a Smartphone simultaneously connected to different networks for different services.
Figure 9:
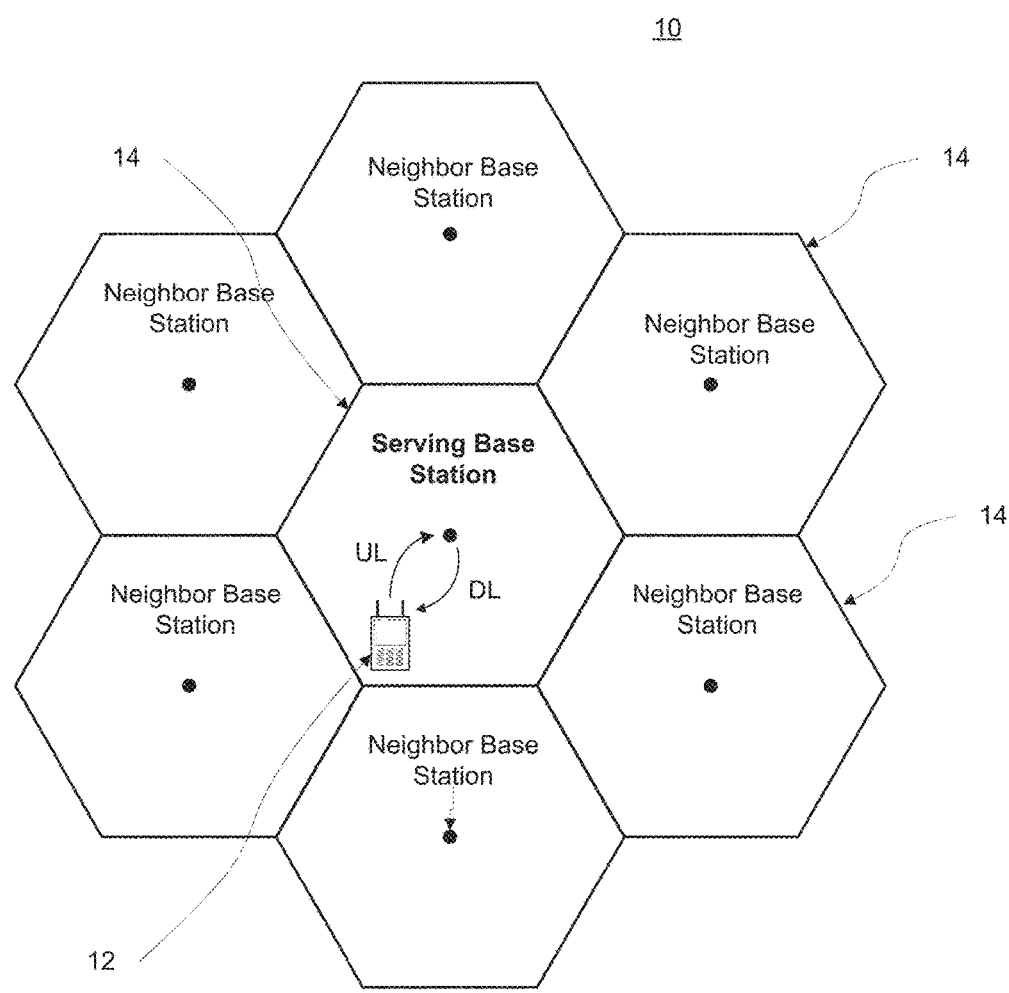
FIG. 9 illustrates a conventional mobile wireless communication system.
Figure 10:
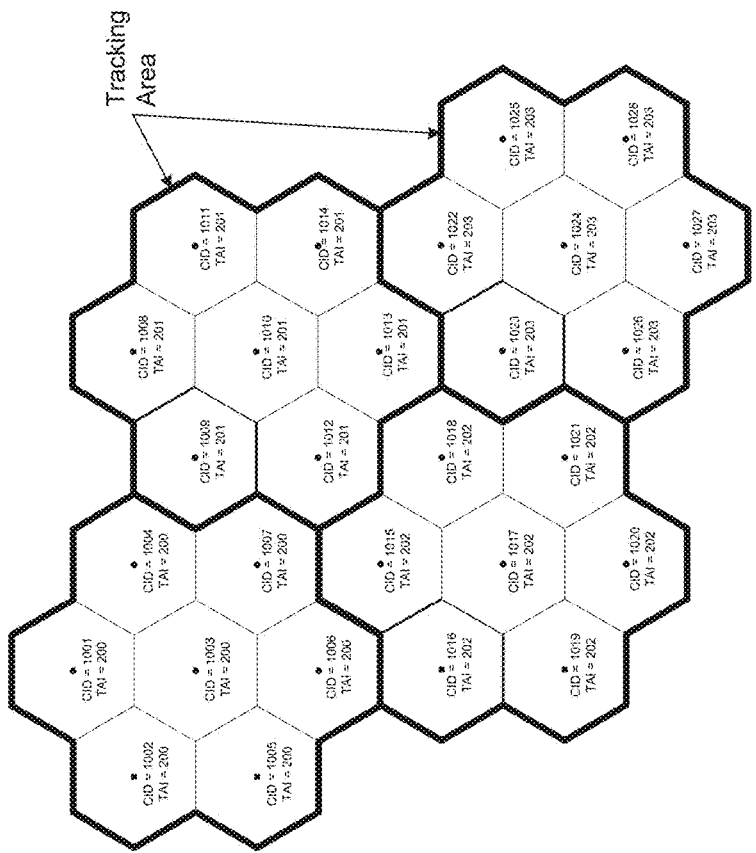
FIG. 10 illustrates the grouping of cells into tracking areas in a wireless communication system.
Figure 11:
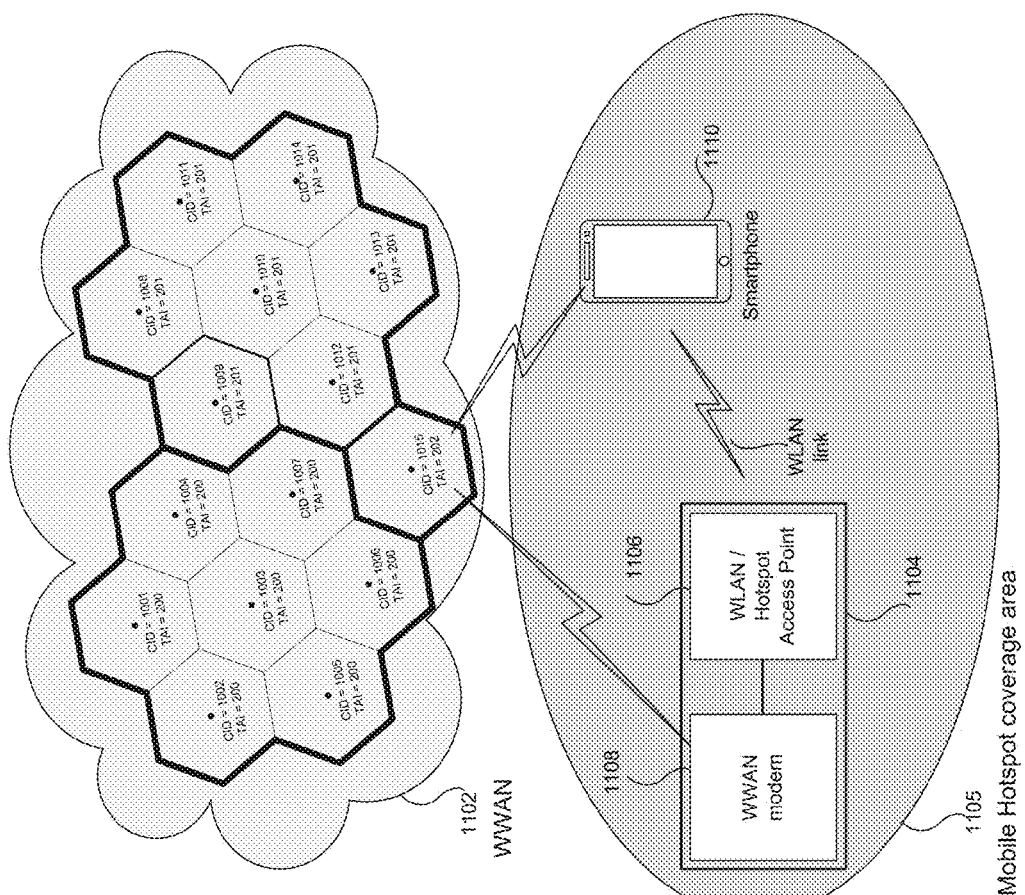
FIG. 11 illustrates an example scenario where the mobile Hotspot and a client device may be camped on the same cell of the same WWAN.

FIG. 11 illustrates an example scenario for the application of present disclosure. As shown in FIG. 11, WWAN coverage 1102 and mobile Hotspot coverage 1105 are illustrated. The mobile Hotspot 1104 comprises the WLAN Access Point (modem) 1106 and WWAN modem 1108. As illustrated in FIG. 3, in another implementation both WLAN modem and WWAN modem may be a single unit. The WWAN modem 1108 is connected to the cell with CID 1015 in the WWAN 1102. The Smartphone 1110 communicates with the mobile Hotspot over the WLAN link for internet services. The Smartphone 1110 also communicates with the cell with CID 1015 for voice calls, SMS, and other services (except internet) provided by the WWAN 1102.

Figure 12:
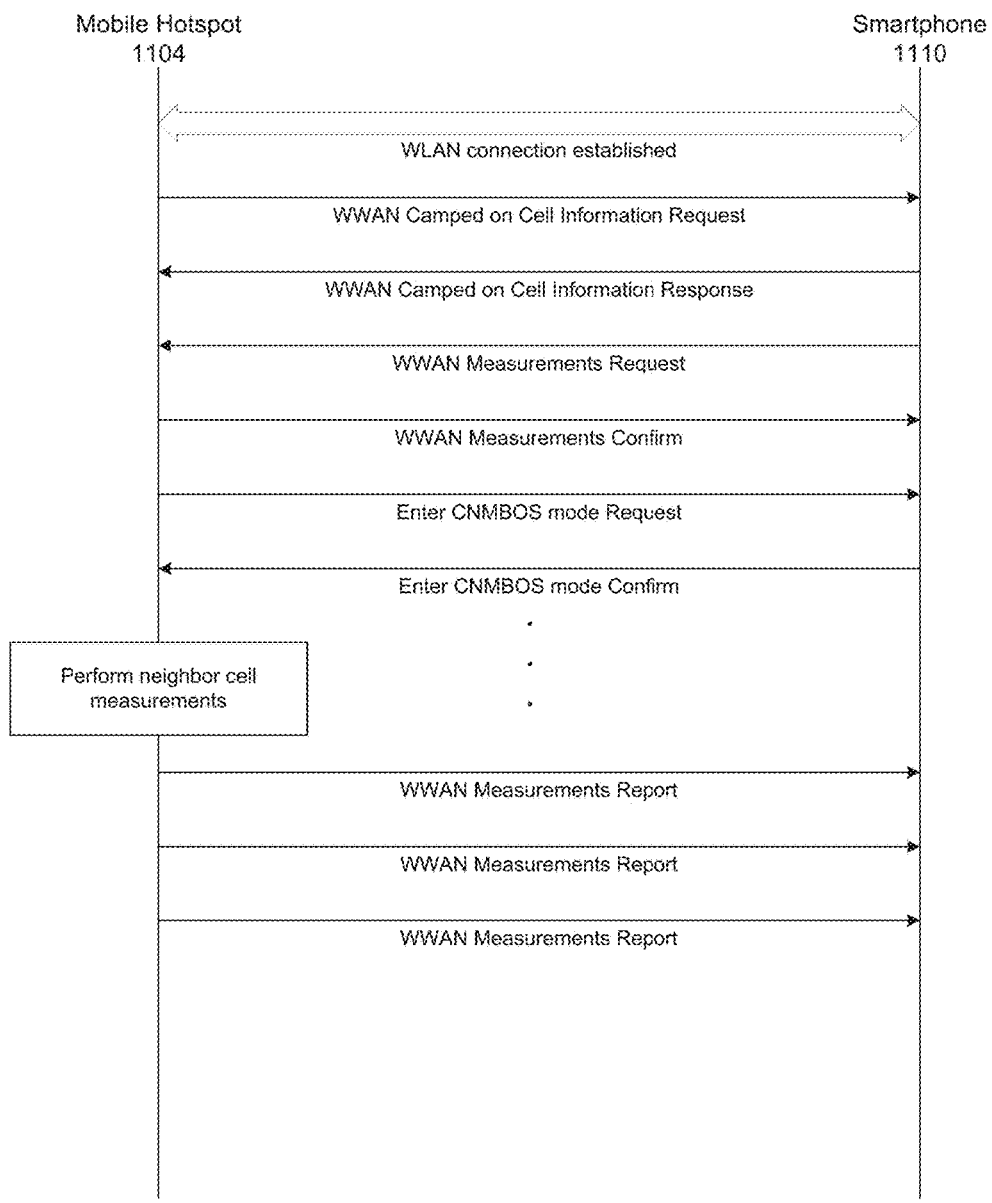
FIG. 12 illustrates a Message Sequence Chart (MSC) for an example scenario for a mobile Hotspot and a client device entering Cellular Neighbor Measurement Broadcast over SRWL (CNMBOS) mode according to the aspects of the present disclosure.

The Message Sequence Chart (MSC) for the messages exchanged between the Hotspot 1104 and the Smartphone 1110 over the WLAN link for entering the CNMBOS mode according to the aspects of the present disclosure is illustrated in FIG. 12. The two entities mobile Hotspot 1104 and the Smartphone 1110 involved in the message exchanges are illustrated at the top. Initially, the WLAN link between the two entities may be established. Next the mobile Hotspot 1104 may send the "WWAN Camped-on Cell Information Request" message, which may include the CID, TAI, frequency, the RAT type, and the PLMN ID of the cell on which the mobile Hotspot 1104 is camped on, to the client device Smartphone 1110 which in return may send the "WWAN Camped on Cell Information Response" message which may include the CID, TAI, frequency, the RAT type, and the PLMN ID of the cell on which the client device Smartphone 1110 is camped on. The client device Smartphone 1110, based on the information received in the "WWAN Camped-on Cell Information Request" message, may determine to request the mobile Hotspot to make a measurement on the client device Smartphone 1110 serving and neighbor cells. The client device Smartphone 1110 may prepare a "WWAN Measurements Request" message which may include the intra-frequency, inter-frequency, and inter-RAT cells on which the client device Smartphone 1110 requests the mobile Hotspot 1104 to make measurements. The client device Smartphone 1110 may include the measurement configuration related parameters in the "WWAN Measurements Request" message. Upon receipt of the "WWAN Measurements Request" message, the mobile Hotspot 1104 may compare the requested RAT types, frequencies and cells with its own measurement capabilities and the time available to make measurements after accounting for time required for making measurements for its own serving and neighbor cells. The mobile Hotspot 1104 may determine that it is able to perform measurements on a subset of the RAT types, frequencies and cells requested by the client device Smartphone 1110. The mobile Hotspot 1104 may then send a "WWAN Measurements Confirm" message which may include the list of RAT types, frequencies and cells on which the mobile Hotspot may be able to make measurements with the supported measurement configuration parameters. Next both the mobile Hotspot and the client device Smartphone 1110 may enter CNMBOS mode. Subsequently, as per the configuration parameters in the "WWAN Measurements Confirm" message, the mobile Hotspot may make periodic measurements, prepare a "WWAN Measurements Report" message, and transmit the report to the client device Smartphone 1110. Based on the contents of the received "WWAN Measurements Report" message, the client device Smartphone 1110 may take further actions such as cell reselection or may take no action at all depending on the RAT type specific criteria.

Figure 13:
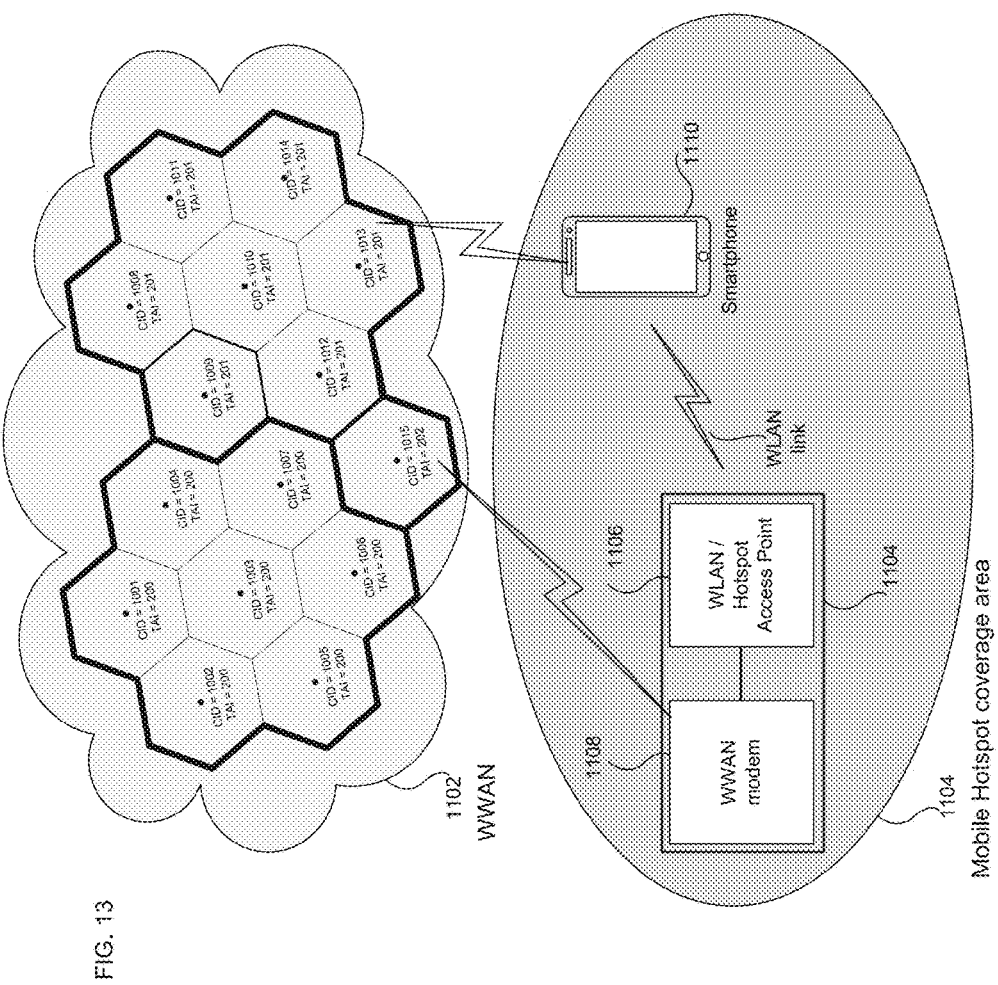
FIG. 13 illustrates an example scenario where the mobile Hotspot and a client device may be camped on different cells of the same WWAN.
Figure 14:
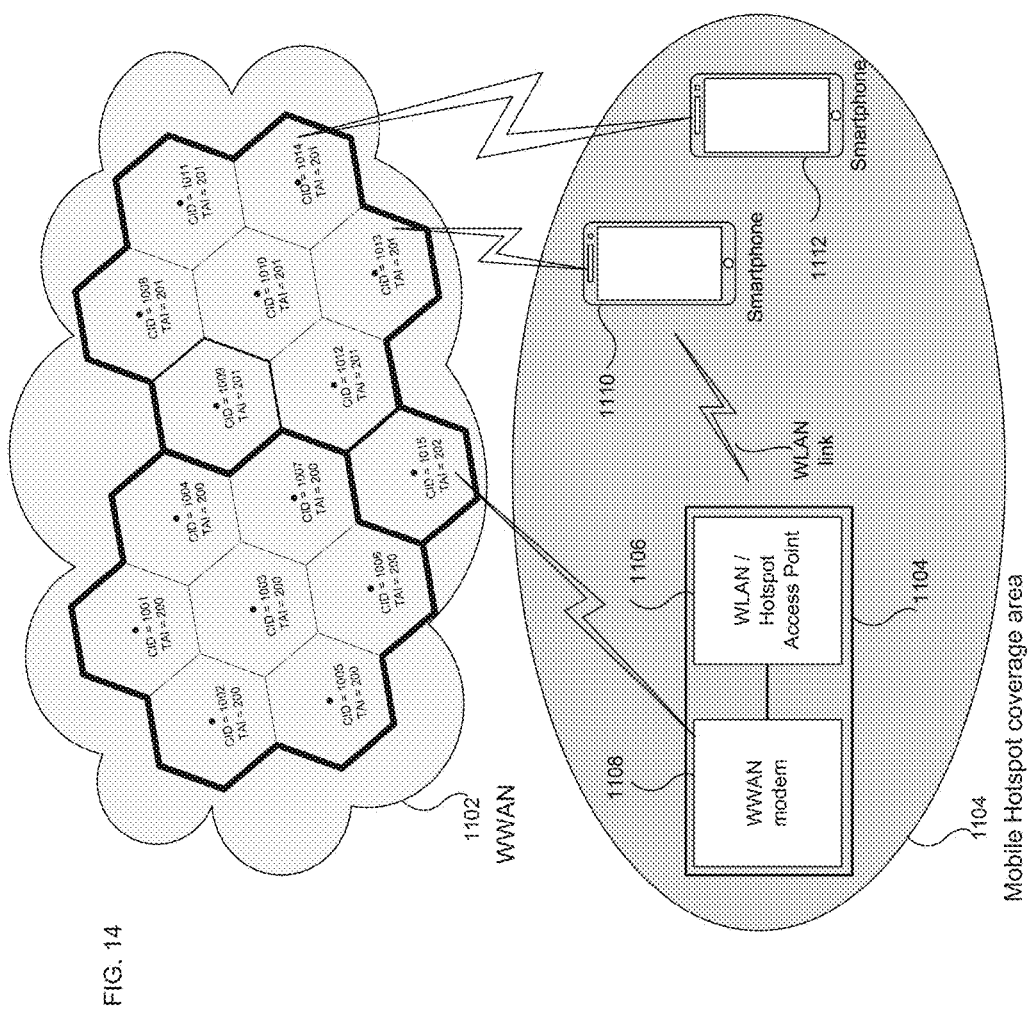
FIG. 14 illustrates an example scenario where the mobile Hotspot and two client devices may be camped on different cells of the same WWAN.

In FIG. 11, the mobile Hotspot 1104 and the client device Smartphone 1110 are shown to be camped on the same cell. However, the present disclosure is applicable to the case where the mobile Hotspot 1104 and the client device Smartphone 1110 may be camped on different cells. This is illustrated in FIG. 13, where the mobile Hotspot 1104 is camped on cell with CID=1015 and the client device Smartphone 1110 is camped on cell with CID=1013. Furthermore, when there are multiple client devices connected to the mobile Hotspot, the multiple client devices may or may not be camped on the same cell. An example scenario with two client devices is illustrated in FIG. 14 where the mobile Hotspot 1104, the client device Smartphone 1110, and the client device Smartphone 1112 are camped on three different cells although all three are connected to each other over the same SRWL. Specifically, the mobile Hotspot 1104 is camped on cell with CID=1015 and the client device Smartphone 1110 is camped on cell with CID=1013, and the client device Smartphone 1112 is camped on cell with CID=1014.

According to an aspect of the present disclosure, when a mobile Hotspot may be built with multiple (for example, M) receiver/decoder circuits, it may make measurements in parallel even for the overlapping measurement windows from multiple (for example, AO cells of the same or different frequencies and RAT types. Note that M and N may not necessarily be the same.

According to an aspect of the present disclosure, when a client device disconnects from the mobile Hotspot and if the client device is not able to find another mobile Hotspot in its current location, then client device may start performing measurements on its own.

A mobile Hotspot may be equipped with more than one source for primary sources of internet. For example, a mobile Hotspot may be equipped with a cable modem and a WWAN modem. According to an aspect of the present disclosure, a mobile Hotspot may be using the cable modem to provide internet service while it may be using the WWAN modem strictly for performing measurements on cells of WWAN, i.e., a mobile Hotspot need not be using the WWAN for providing internet service in order to make measurements on WWAN cells.

A client device operating according to the aspects of the present disclosure may enter power save mode without performing neighbor cell measurements which may lead to reduced power consumption and extended battery life. According to an aspect of the present disclosure, when the client device enters the CNMBOS mode, the client device may turn off the Radio Frequency (RF) receiver of the cellular modem when it need not perform measurements and may enter a power save state. This may be a significant advantage for deeply embedded client devices powered with limited capacity batteries. For the case where the mobile Hotspot and client devices are camped on the same cell of the same frequency and the same RAT type, the mobile Hotspot need not do any additional neighbor cell measurements beyond what it may normally do for its own WWAN modem. This may be the most common case when the mobile Hotspot and client devices have the service from the WWAN with the same PLMN.

Figure 15:
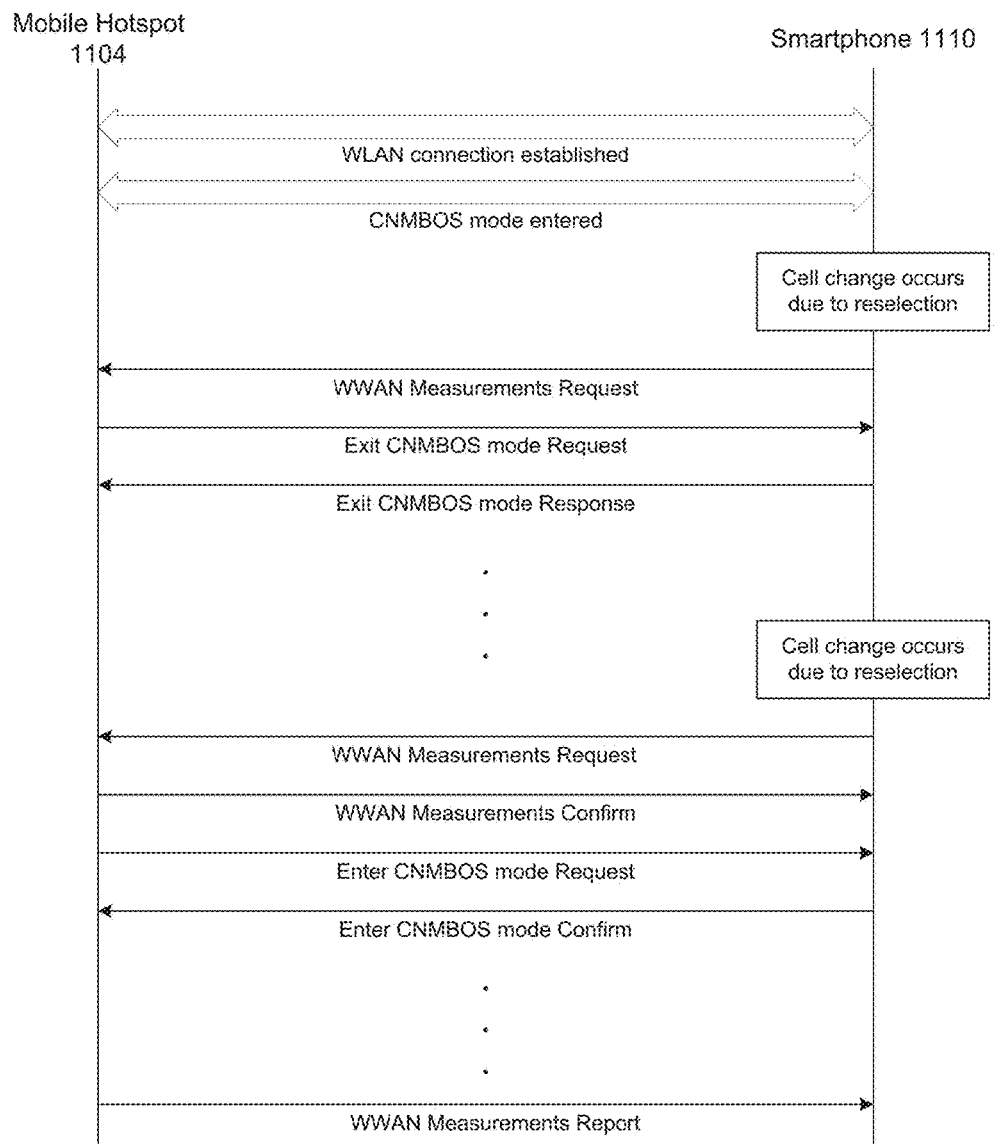
FIG. 15 illustrates an MSC for an example scenario for the handling of cell reselection by a client device leading to the exit from CNMBOS mode followed by another reselection leading to entering of CNMBOS mode according to the aspects of the present disclosure.

According to an aspect of the present disclosure, when the mobile Hotspot and the client devices are in CNMBOS mode and if a cell change occurs in either mobile Hotspot or in one or more of the client devices and if the mobile Hotspot may not able to continue the CNMBOS mode with one or more of the client devices then the mobile Hotspot may send "Exit CNMBOS mode Request" to one or more of the client devices and may exit the CNMBOS mode with those client devices. An example of this type of scenario is illustrated in FIG. 15 where initially the mobile Hotspot 1104 and the client device Smartphone 1110 are in CNMBOS mode. At some point the client device Smartphone 1110 may perform cell reselection and to ensure that the CNMBOS mode can be continued, it may send the "WWAN Measurements Request" message to the mobile Hotspot to update its list of cells on which to make measurements. The mobile Hotspot 1104 may determine that it may not be able to support the CNMBOS mode for the client device Smartphone 1110 for the newly provided list of cells. Therefore, the mobile Hotspot 1104 may send the "Exit CNMBOS mode Request" message to the client device Smartphone 1110 which may accept the request and send the "Exit CNMBOS mode Confirm" message to the mobile Hotspot. From this point in time, the client device Smartphone 1110 may begin performing neighbor cell measurements on its own. At further later point in time, the client device Smartphone 1110 may perform another cell reselection and to determine the CNMBOS mode can be entered, it may send the "WWAN Measurements Request" message to the mobile Hotspot 1104 to update the list of neighbor cells on which to make measurements. The mobile Hotspot 1104 may determine that it may be able to support the CNMBOS mode for the client device Smartphone 1110 for the newly provided list of neighbor cells. Therefore, the mobile Hotspot 1104 may send the "WWAN Measurements Confirm" message to the client device Smartphone 1110. Then, the mobile Hotspot 1104 may send the "Enter CNMBOS mode Request" message to the client device Smartphone 1110 which may accept the request and send the "Enter CNMBOS mode Response" message to the mobile Hotspot. From this point forward, the mobile Hotspot 1104 may start performing measurements on the list of cells provided by the client device Smartphone 1110.

Figure 16:
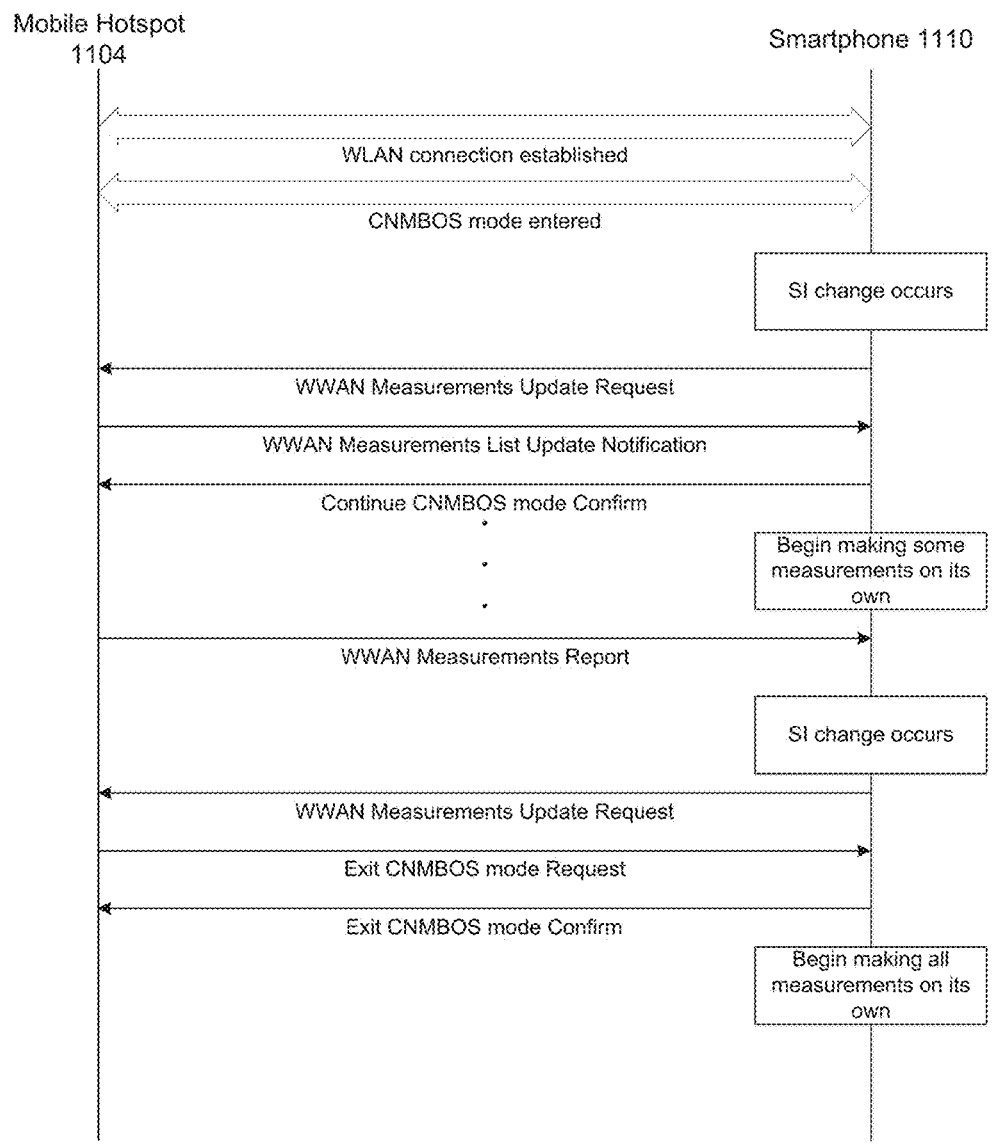
FIG. 16 illustrates an MSC for an example scenario for the handling of System Information (SI) change of the cell camped on by a client device, leading to partial measurements by a mobile Hotspot and partial measurements by the client device and eventual exit from CNMBOS mode according to the aspects of the present disclosure.

The SI of the cell on which the client device is camped may change which in turn may change the list of neighbor cells for which the client device may need to perform the measurements. When the client device detects the change in the list of neighbor cells on which to perform the measurements, the client device may send "WWAN Measurements Update Request" message to the mobile Hotspot which in turn may lead to a change in the scheduling of various measurements at the mobile Hotspot. According to an aspect of the present disclosure, when the mobile Hotspot and the client devices are in CNMBOS mode and if there is a change in the list of neighbor cells for which the client device expects the mobile Hotspot to perform the measurements and if the mobile Hotspot determines that it may be able to accommodate the new list of neighbor cells by performing the measurements on one or more, including all, of the cells included in the updated list provided by the client device, the mobile Hotspot may send the "WWAN Measurements List Update Notification" message to communicate to the client device about the list of cells on which the mobile Hotspot may be able to make measurements. According to an aspect of the present disclosure, if the mobile Hotspot can make measurements on at least one of the cells from the updated list of neighbor cells provided by the client device, then the client device may send a positive acknowledgement using the "Continue CNMBOS mode Confirm" message to the mobile Hotspot as illustrated in FIG. 16. According to an aspect of the present disclosure, upon reception of the acknowledgment from the client device, both the client device and the mobile Hotspot may continue the CNMBOS mode. According to an aspect of the present disclosure, the mobile Hotspot may determine that it may be unable to perform measurements on any of the cells in the updated neighbor cell list provided by the client device and it may deny the measurements request entirely by sending a negative acknowledgment to the client device. According to an aspect of the present disclosure, when the mobile Hotspot and the client devices are in CNMBOS mode and if there is a change in the list of neighbor cells for which the client device expects the mobile Hotspot to perform the measurements and if the mobile Hotspot may not be able to continue the CNMBOS mode with one or more of the client devices, then in this case, the mobile Hotspot may send "Exit CNMBOS mode Request" to one or more of the client devices which may send the "Exit CNMBOS mode Confirm" and may exit the CNMBOS mode with those client devices as illustrated in FIG. 16.

Figure 17:
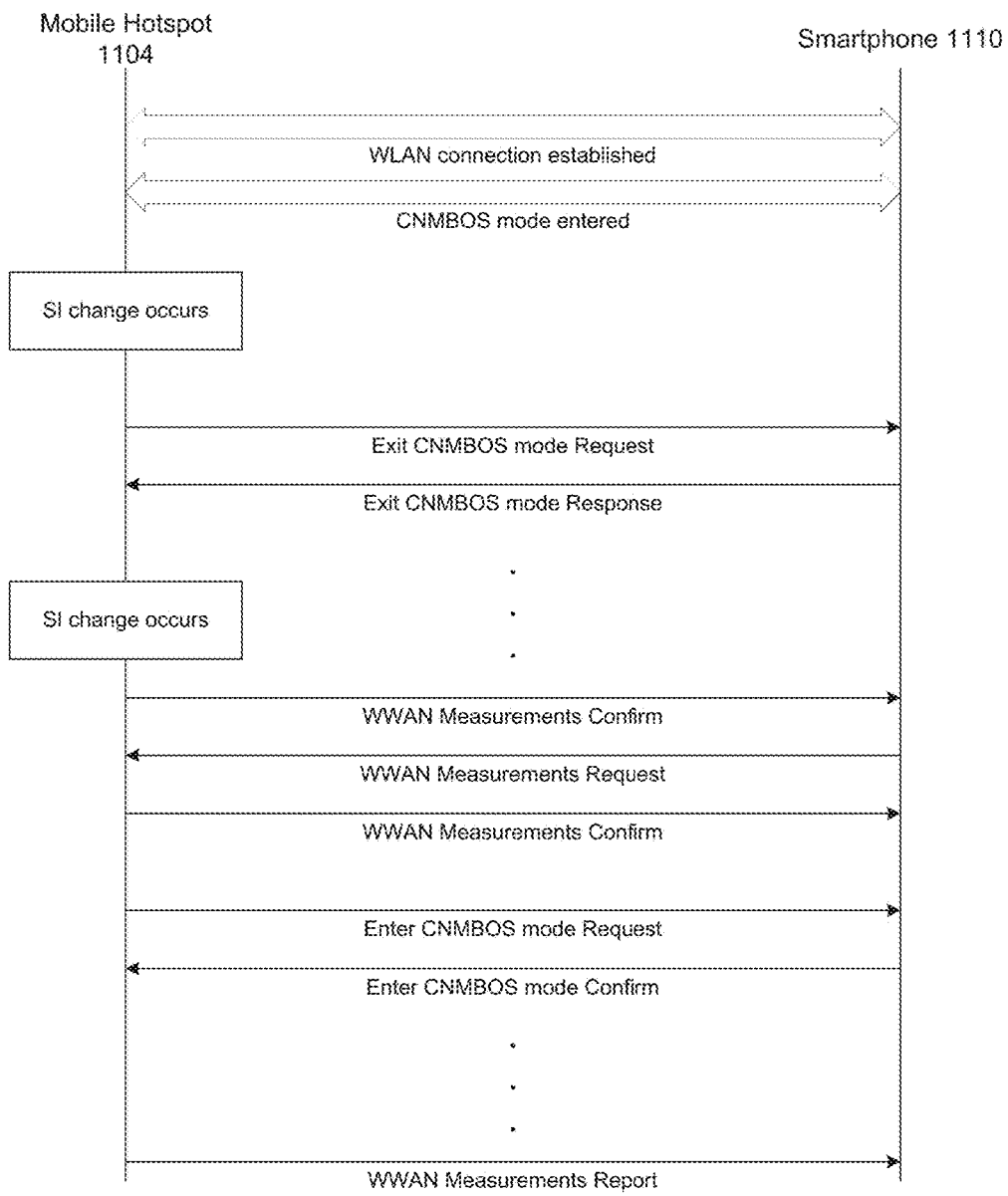
FIG. 17 illustrates an MSC for an example scenario for the handling of SI change of the cell camped on by the mobile Hotspot leading to exit from CNMBOS mode followed by another reselection leading to entry into CNMBOS mode according to the aspects of the present disclosure.

The SI of the cell on which the mobile Hotspot is camped may change which in turn may lead to change in the scheduling of various measurements at the mobile Hotspot. This in turn may impact whether the mobile Hotspot can continue to be in CNMBOS mode and make measurements on neighbor cells for the client devices. According to an aspect of the present disclosure, when the mobile Hotspot and the client devices are in CNMBOS mode and if there is a change in the SI for the mobile Hotspot serving cell or mobile Hotspot performs cell reselection, the mobile Hotspot may not be able to continue the CNMBOS mode with one or more of the client devices. In this case, the mobile Hotspot may send "Exit CNMBOS mode Request" to one or more of the client devices and may exit the CNMBOS mode with those client devices. An example MSC for handling this type of scenario is illustrated in FIG. 17 where initially the mobile Hotspot 1104 and the client device Smartphone 1110 are in CNMBOS mode. At some point in time, the SI of the camped on cell of the client device Smartphone 1110 may be updated by the WWAN. The mobile Hotspot 1104 may determine that it may not be able to support the CNMBOS mode for the client device Smartphone 1110 for the newly updated SI. Therefore, the mobile Hotspot 1104 may send the "Exit CNMBOS mode Request" message to the client device Smartphone 1110 which may accept the request and send the "Exit CNMBOS mode Confirm" message to the mobile Hotspot 1104. At further later point in time, the SI of the camped on cell of the mobile Hotspot 1104 may be updated by the network and the mobile Hotspot may send the "WWAN Measurements Confirm" message to the client device to indicate that the mobile Hotspot 1104 may now be able to resume neighbor cell measurements for the client device. The client device Smartphone 1110 may send the "WWAN Measurements Request" with the updated list of cells on which measurements need to be done. The mobile Hotspot 1104 may determine that it may be able to support the CNMBOS mode for the client device Smartphone 1110 for the newly updated list of neighbor cells. Therefore, the mobile Hotspot 1104 may send the "WWAN Measurements Confirm" message followed by the "Enter CNMBOS mode Request" message to the client device Smartphone 1110 which may accept the request and send the "Enter CNMBOS mode Response" message to the mobile Hotspot 1104. From this point forward, the mobile Hotspot 1104 may continue to start performing measurements on the list of cells provided by the client device Smartphone 1110.

Figure 18:
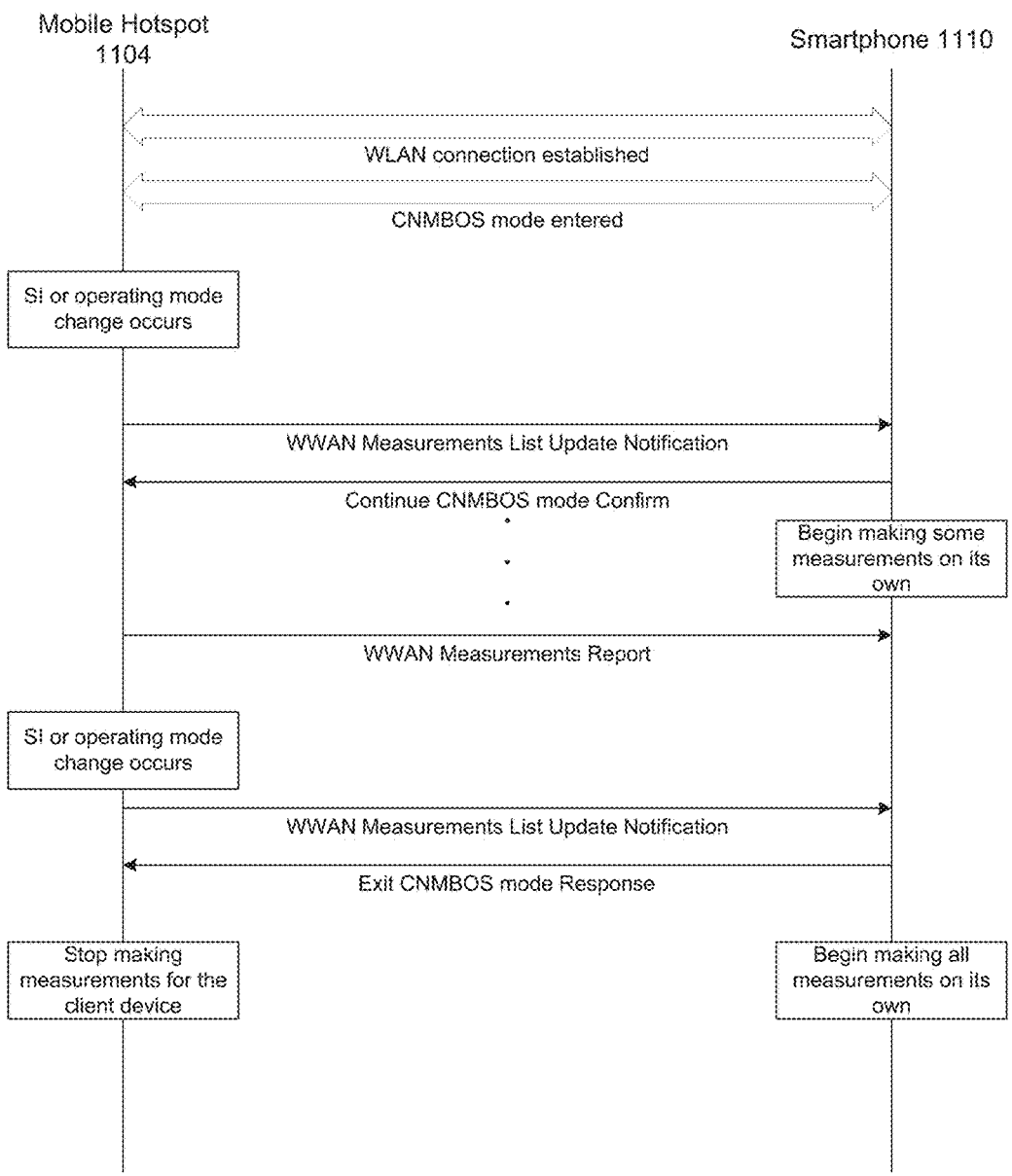
FIG. 18 illustrates an MSC for an example scenario for the handling of operating mode change by the mobile Hotspot, leading to partial measurements by mobile Hotspot and partial measurements by the client device and eventual exit from CNMBOS mode according to the aspects of the present disclosure.

According to an aspect of the present disclosure, at any point of time, because of a change in the operating mode of the mobile Hotspot, the mobile Hotspot may determine that it may not be able to continue to support some of the neighbor cell measurements that were previously communicated to the client device. An operating mode change may include, for example, transition from active connection to idle mode. In such a scenario the mobile Hotspot may send the "WWAN Measurements List Update Notification" message to the client device with the updated neighbor cell list for which the mobile Hotspot may continue to support the measurements for the client device. According to an aspect of the present disclosure, upon receiving the "WWAN Measurements List Update Notification" from the mobile Hotspot, the client device may send "Continue CNMBOS mode Confirm" message to the mobile Hotspot to continue in the CNMBOS mode and the client device may perform the measurements for the neighbor cell on its own for the neighbor cells that are removed from the list by the mobile Hotspot as illustrated in FIG. 18. According to another aspect of the present disclosure upon receiving the "WWAN Measurements List Update Notification" from the mobile Hotspot, if the client device determines that the mobile Hotspot updated neighbor cell list measurements may not be serving the purpose of the CNMBOS mode then the client device may decide to exit the CNMBOS mode with the mobile Hotspot and may send the "Exit CNMBOS mode Confirm" message to the mobile Hotspot that it is exiting the CNMBOS mode and the client device may start performing the neighbor cell measurements on its own as illustrated in FIG. 18.

According to an aspect of the present disclosure, a mobile Hotspot may perform SI monitoring and updating the client devices as described in U.S. patent application Ser. No. 15/233,488 filed Aug. 10, 2016, incorporated by reference herein. Upon reception of an updated SI, the client device may determine that the list of neighbor cells on which the measurements need to be performed is updated and may communicate the updated list of neighbor cells to the mobile Hotspot as illustrated in FIG. 18 to determine whether the CNMBOS mode can be continued for the updated list of neighbor cells. The remaining processing remains similar to the case where the SI reception directly from WWAN may be performed by the client device.

Since the locations of a client device and the mobile Hotspot may be different, the values of the various measurements such as RSSI, RSRP, RSRQ, etc., for a particular cell may be different for a client device and the mobile Hotspot. Because of this, when using the measurements reports from the mobile Hotspot for making cell reselection and handover decisions, a client device may make a different decision compared to the case when using the measurements performed by itself. According to an aspect of the present disclosure, to ensure correct cell reselection and handover decisions, a client device may perform estimation and compensation for the differences in the measurements made by the client device and the Hotspot. Different methods may be used for the estimation and compensation of the differences in measurements between a client device and the mobile hotspot and one such method is described next. According to an aspect of the present disclosure, to compensate for the differences in measurement values with the mobile Hotspot, a client device may continue to perform its own measurements even after entering the CNMBOS mode. According to an aspect of the present disclosure, after receiving a configurable number of "WWAN Measurements Report" messages in CNMBOS mode, the client device may compare its own measurements against the average of the values received in the "WWAN Measurements Report" for each cell and estimate a compensation value for each metric. For example, for one cell, the measured RSSI may be higher by $\Delta_1$ dB for the mobile Hotspot compared to the RSSI measured by the client device for the same cell. For example, for another cell, the measured RSSI may be lower by $\Delta_2$ dB for the mobile Hotspot compared to the RSSI measured by the client device for the same cell. According to an aspect of the present disclosure, after establishing the compensation values for each metric for each cell, the client device may stop performing measurements by itself and start using the measurements reports from the mobile Hotspot in combination with the established compensation values to make cell reselection and handover decisions. According to an aspect of the present disclosure, a client device may periodically update the established compensation values by performing measurements by itself. For example, a client device may make its own measurements once every 10 minutes to update the compensation values.

Although the term "mobile Hotspot" is used herein to describe the various aspects of the present disclosure, the disclosure may be applicable to any Hotspot that may be using a WWAN and the Hotspot may not necessarily be mobile. Furthermore, the connectivity between the Hotspot device and the client devices may not necessarily be SRWL. For example, the Hotspot device and the client devices may be communicating over a wired connection such as Universal Serial Bus (USB), Universal Asynchronous Receiver/Transmitter (UART), Inter-Integrated Circuit (I2C), General Purpose Input/Output (GPIO), Ethernet cables, etc. In one example of connectivity, the client devices may be connected to the Hotspot over Ethernet for internet connection but may continue to use the WWAN for other services. In this case the Hotspot may use its own WWAN modem to perform measurements on the list of neighbor cells provided by the client device and provide the measurements report to the client devices over the Ethernet. In another example, a client device may be connected to a Personal Computer (PC) that has a built-in WWAN modem. The client device may be connected to the PC over a USB cable for charging and/or transferring music, images, videos, etc. between the PC and the client device. In this case, the PC may be in the equivalent role of a Hotspot. The PC may use its WWAN modem to perform measurements on the list of neighbor cells provided by the client device and provide the measurements reports to the client devices over the USB cable.

The invention claimed is:

1. A method for communication of measurement information in a wireless communication network, the method comprising:
controlling, by a processing device, at a hotspot device communicatively connectable with a client device via other than a Wireless Wide Area Network (WWAN) of the wireless communication network,
receiving a request from the client device, over a Short Range Wireless Link (SRWL), to perform measurements on at least one of a serving cell or at least one neighbor cell of the client device indicated on a list transmitted with the request;
determining a neighbor cell measurement schedule for the hotspot device;
determining whether the measurements are performable by the hotspot device on at least one given cell indicated in the list; and
when the measurements are determined to be performable for at the least one given cell, communicating to the client device a positive acknowledgement with an indication of each first cell indicated in the list for which the measurements are determined to be performable, and
when the measurements are determined not to be performable on any cell indicated in the list, communicating to the client device a negative acknowledgement with an indication the measurements are determined to be not performable for any of the cells indicated in the list, in which the communicating to the client device of the indication notifies whether the client device is to perform measurements on a given cell indicated in the list.

2. The method of claim 1, wherein the list indicates at least one intra-frequency, inter-frequency or inter-Radio Access Technology (RAT) cell.

3. The method of claim 1, wherein the list indicates only at least one given Radio Access Technology (RAT) type or at least one given frequency band for which the client device requests the hotspot device to perform the measurements.

4. The method of claim 1, further comprising:
controlling, by the processing device, at the hotspot device, entering into a Cellular Neighbor Measurement Broadcast over SRWL (CNMBOS) mode with the client device, when the positive acknowledgement is communicated.

5. The method of claim 4, further comprising:
controlling, by the processing device, at the hotspot device,
when the hotspot device enters the CNMBOS mode, performing at least one periodic measurements on each first cell.

6. The method of claim 5, further comprising:
controlling, by the processing device, at the hotspot device,
transmitting results of the at least one periodic measurements to the client device as a measurement report indicating identifying details for each of the first cells, in which the details include at least one of Cell Identity (CID), frequency, or Radio Access Technology (RAT) type, and at least one measurement metric of Received Signal Strength Indicator (RSSI), Reference Signal Received power (RSRP), Reference Signal Received Quality (RSRQ) or timing offset.

7. The method of claim 6, wherein a measurement metric type for the at least one periodic measurements is different for different RAT types.

8. The method of claim 6, further comprising:
controlling, by the processing device, at the hotspot device, performing the at least one period measurements using a default measurement configuration.

9. The method of claim 8, wherein the default measurement configuration is once every 200 millisecond without any filtering, and
wherein the at least one periodic measurements are reported to the client device when a threshold is exceeded.

10. The method of claim 9, wherein the threshold is exceeded when the RSRP is determined to be a power ratio of >−120 decibels (dB) of measured power referenced to one milliwatt.

11. The method of claim 5, further comprising:
controlling, by the processing device, at the hotspot device,
negotiating a measurement configuration for performing the at least one periodic measurements, wherein the configuration includes at least one of periodicity, a filtering coefficient or reporting criteria; and
determining whether a given measurement configuration is acceptable, based on the neighbor cell measurement schedule of the hotspot device.

12. The method of claim 5, further comprising:
controlling, by the processing device, at the hotspot device, when the at least one periodic measurements are being performed, detecting at least one other neighbor cell other than a given cell indicated in the list and communicating details of measurements performed for the at least one other neighbor cell in a measurements report indicating identifying details for each of the first cells based on the at least one periodic measurements transmitted to the client device.

13. The method of claim 12, further comprising:
controlling, by the processing device, at the hotspot device,
determining, from the at least one periodic measurements, a single best cell of the first cells having a first Radio Access Technology (RAT) type and a first frequency as a timing reference for determining relative time offset (RTO) of all other of the first cells having the same first RAT type and the first frequency;
determining, and reporting to the client device in the measurements report, the RTOs for each of the other of the first cells, in which the measurement reports indicates an identity of the single best cell.

14. The method of claim 13,
wherein a current serving cell of the client device is the single best cell and the measurements report indicates timing offset of given cells of the first cells with respect to the current serving cell.

15. The method of claim 5, further comprising:
controlling, by the processing device, at the hotspot device,
when the SRWL through which the hotspot device and the client device are connected allows time synchronization of the hotspot device and the client device, using synchronized time as a common time reference for reporting relative time offset (RTOs) for all of the first cells from all Radio Access Technology (RAT) types and frequencies.

16. The method of claim 15,
wherein, when the SRWL is a Wireless LAN (WLAN), a beacon signal of the WLAN is used as a time reference for reporting the RTOs for the first cells.

17. The method of claim 5, further comprising:
controlling, by the processing device, at the hotspot device,
at any time communicating to the client device that the hotspot device is about to exit CNMBOS mode, and
before exiting the CNMBOS mode at the hotspot device, sending a most recent neighbor measurements report to the client device based on the at least one periodic measurements.

18. The method of claim 5, further comprising:
controlling, by the processing device, at the hotspot device,
reporting the measurements through an application based on a peer-to-peer protocol executed in the hotspot device and the client device, in which the peer-to-peer protocol based application communicates through a logical channel provided by a given SRWL used between the hotspot device and the client device, is independent of the given SRWL and is achieved through a virtual communication port established in the hotspot device and the client device.

19. The method of claim 18,
wherein when the given SRWL is a Wireless LAN (WLAN), the peer-to-peer protocol is a Transmission Control Protocol (TCP) and the Internet Protocol (IP) TCP/IP socket communication between the hotspot device and the client device.

20. The method of claim 4, further comprising:
controlling, by the processing device, at the hotspot device,
entering the CNMBOS mode individually with a plurality of first client devices including the client device simultaneously.

21. The method of claim 20, in which a first plurality of the first client devices and the hotspot device are camped on to a same cell of a same Radio Access Technology (RAT) type and frequency of a same given WWAN.

22. The method of claim 20, further comprising:
controlling, by the processing device, at the hotspot device, at least one of
(i) performing a single set of measurements, organizing a measurements report as a single composite report and transmitting the composite report as a broadcast message addressing all the first client devices, or
(ii) performing more than one set of measurements, organize multiple measurements reports and transmitting the multiple measurement reports at least one of (a) as broadcast messages addressing all the first client devices or (b) to respective individual ones of the first client devices using respective dedicated messages.

23. The method of claim 4, further comprising:
controlling, by the processing device, at the hotspot device,
entering the CNMBOS mode autonomously, without negotiating with any given client device, and
starting broadcasting measurements reports for a currently camped serving cell of the hotspot device and all neighbor cells detected as belonging to a same network.

24. The method of claim 23, wherein the measurements reports are broadcast whenever at least one given client device is connected to the hotspot device over the SRWL.

25. The method of claim 4, further comprising:
controlling, by the processing device, at the hotspot device,
deciding to create a new physical or logical channel as a Cellular Neighbor Cell Measurement Broadcast Channel (CNCMBC), based on negotiation between the hotspot device and the client device in which the new physical or logical channel for the CNMBOS mode related information exchange is dedicated, in which the CNCMBC has a periodicity and time slot in which to unicast or broadcast neighbor cell measurements reports from the hotspot device, and
in which the CNCMBC is configured for monitoring by the client device according to a pre-defined periodicity and time slot to receive the neighbor cell measurements report from the hotspot device.

26. The method of claim 4, further comprising, when the hotspot device includes a plurality of receiver/decoder circuits, controlling, by the processing device, at the hotspot device making the measurements in parallel even for overlapping measurement windows from a plurality of cells of a same or different frequencies and Radio Access Technology (RAT) types, in which a number of the plurality of receiver/decoder circuits and a number of the plurality of cells are the same or different.

27. The method of claim 4, further comprising, when the hotspot device is equipped with more than one source as a primary source of internet, controlling, by the processing device, at the hotspot device, using a first primary source to provide internet service and a second primary source only for performing measurements on at least one given cell of the WWAN.

28. The method of claim 27, wherein the more than one source includes a cable modem and a WWAN modem.

29. The method of claim 4, further comprising, when (i) the hotspot device and the client device are in the CNMBOS mode, (ii) a cell change occurs in at least one of the hotspot device or the client device and (iii) the hotspot device is not able to continue in the CNMBOS mode with the client device, controlling, by the processing device, at the hotspot device, sending an Exit CNMBOS mode Request to, and exiting the CNMBOS mode with, the client device.

30. The method of claim 29, further comprising:

controlling, by the processing device, at the hotspot device, receiving a WWAN Measurements Request message from the client device, in which the WWAN Request message indicates a request indicating at least one updated neighbor cell on which to make measurements, in which the WWAN Request message is transmitted from the client device based on a determination, subsequent to the Exit CNMBOS mode Request being sent, by the client device that the CNMBOS mode can be entered based on another cell reselection being performed at the client device; and controlling, by the processing device, at the hotspot device, based on a determination that the hotspot device is able to support the CNMBOS mode for the client device for the at least one updated neighbor cell, transmitting a WWAN Measurements Confirm message to the client device.

31. The method of claim 4, further comprising:

when (i) the hotspot device and the client device are in the CNMBOS mode, (ii) at least one of given cell of the cells indicated in the list is changed, (iii) the hotspot device determines the measurements are performable on at least one cell indicating on an updated list including at least one updated neighbor or serving cell transmitted from the client device, controlling, by the processing device, at the hotspot device, transmitting a WWAN Measurements List Update Notification message to the client device about each cell of the updated list; and receiving a positive acknowledgement from the client device including a Continue CNMBOS mode Confirm message, in which the Continue CNMBOS mode Confirm message is transmitted by the client device when a determination at the client device is that the measurements are performable by the hotspot device on at least one cell from the updated list, wherein, following reception of the positive acknowledgment, the client device and the hotspot device operate in the CNMBOS mode.

32. The method of claim 31, further comprising:

when the hotspot device determines the measurements are not performable on any cell of the updated list, controlling, by the processing device, at the hotspot device, transmitting a negative acknowledgment to the client device indicating denial of a measurements request in its entirely.

33. The method of claim 4, further comprising:

when (i) the hotspot device and the client device are in the CNMBOS mode, (ii) a change in the list is determined, and (iii) the hotspot device is not able to continue in the CNMBOS mode with the client device, controlling, by the processing device, at the hotspot device, transmitting an Exit CNMBOS mode Request to the client device, receiving an Exit CNMBOS mode Confirm from the client device transmitted responsive to the Exit CNMBOS mode Request, and exiting the CNMBOS mode with the client device.

34. The method of claim 4, further comprising:

when (i) the hotspot device and the client device are in the CNMBOS mode and (ii) at least one of (a) system information (SI) for a serving cell of the hotspot device is changed or (b) cell reselection is performed at the hotspot device, controlling, by the processing device, at the hotspot device, transmitting an Exit CNMBOS mode Request to, and exiting the CNMBOS mode with, the client device, when the Hotspot device is not able to continue in the CNMBOS mode with the client device.

35. The method of claim 34, further comprising:

when, subsequent to the exiting the CNMBOS mode with the client device, the SI of serving cell of the hotspot device is updated by the network, controlling, by the processing device, at the hotspot device, transmitting a WWAN Measurements Confirm message to the client device indicating the hotspot device is able to resume the measurements for the client device; and receiving from the client device a WWAN Measurements Request with an updated list of neighbor cells on which to perform the measurements;

when a determination is the hotspot device is able to support the CNMBOS mode for the client device for at least one updated cell indicated in the updated list, transmitting a WWAN Measurements Confirm message and an Enter CNMBOS mode Request message to the client device, and receiving an Enter CNMBOS mode Response message from the client device.

36. The method of claim 4, further comprising:

when a determination is the hotspot device is not able to continue to perform the measurements as indicated by the positive acknowledgement, controlling, by the processing device, at the hotspot device, transmitting a WWAN Measurements List Update Notification message to the client device with an updated neighbor cell list indicating at least one updated neighbor cell for the which measurements for the client device are performable at the hotspot device; and receiving from the client device, transmitted by the client device responsive to the WWAN Measurements List Update Notification message, a Continue CNMBOS mode Confirm message indicating the hotspot device to continue in the CNMBOS mode, in which the client device performs measurements for at least one second cell of the first cells not on the updated list.

37. The method of claim 36, in which the hotspot device is not able to continue to perform the measurements indicated in the positive acknowledgement when an operating mode transitions from an active connection to an idle mode.

38. The method of claim 36, controlling, by the processing device, receiving, at the hotspot device, an Exit CNMBOS mode Confirm message from the client device indicating the client device is exiting the CNMBOS mode, in which the Exit CNMBOS mode Confirm message is transmitted when the client device determines that measurement for the updated neighbor cell list is not serving a purpose of the CNMBOS mode, exits the CNMBOS mode with the hotspot device and starts to perform neighbor cell measurements.

39. The method of claim 4, controlling, by the processing device, at the hotspot device, monitoring system information (SI) and transmitting to the updated SI to the client device; and receiving an updated list of neighbor cells from the client device, in which the updated list is determined based on the updated SI; and determining whether the CNMBOS mode can be continued for the updated list of neighbor cells.

40. An apparatus for communication of measurement information in a wireless communication network, the apparatus comprising:

circuitry configured to control, at a hotspot device communicatively connectable with a client device via other than a Wireless Wide Area Network (WWAN) of the wireless communication network, receiving a request from the client device, over a Short Range Wireless Link (SRWL), to perform measurements on at least one of a serving cell or at least one neighbor cell of the client device indicated on a list transmitted with the request;

determining a neighbor cell measurement schedule for the hotspot device;

determining whether the measurements are performable by the hotspot device on at least one given cell indicated in the list; and when the measurements are determined to be performable for at the least one given cell, communicating to the client device a positive acknowledgement with an indication of each first cell indicated in the list for which the measurements are determined to be performable, and when the measurement are determined not to be performable on any cell indicated in the list, communicating to the client device a negative acknowledgement with an indication the measurements are determined to be not performable for any of the cells indicated in the list, in which the communicating to the client device of the indication notifies whether the client device is to perform measurements on a given cell indicated in the list.

41. A wireless communication device comprising:

a receiver to receive a wireless communication; and a processing device configured for communication of measurement information in a wireless communication network, wherein the wireless communication device as a hotspot device is communicatively connectable with a client device via other than a Wireless Wide Area Network (WWAN) of the wireless communication network, wherein the processing device is configured to control:

receiving a request from the client device, over a Short Range Wireless Link (SRWL), to perform measurements on at least one of a serving cell or at least one neighbor cell of the client device indicated on a list transmitted with the request;

determining a neighbor cell measurement schedule for the communication device;

determining whether the measurements are performable by the communication t device on at least one given cell indicated in the list; and when the measurements are determined to be performable for at the least one given cell, communicating to the client device a positive acknowledgement with an indication of each first cell indicated in the list for which the measurements are determined to be performable, and when the measurement are determined not to be performable on any cell indicated in the list, communicating to the client device a negative acknowledgement with an indication the measurements are determined to be not performable for any of the cells indicated in the list, in which the communicating to the client device of the indication notifies whether the client device is to perform measurements on a given cell indicated in the list.

42. A method for communication of measurement information in a wireless communication network, the method comprising:

controlling, by a processing device, at a client device communicatively connectable with a hotspot device via other than a Wireless Wide Area Network (WWAN) of the wireless communication network, transmitting to the hotspot device, over a Short Range Wireless Link (SRWL), a request to perform measurements on at least one of a serving cell or at least one neighbor cell of the client device indicated on a list transmitted with the request; and receiving, at the client device, a communication from the hotspot device based on a determination at the hotspot device, using a neighbor cell measurement schedule for the hotspot device, whether measurements are performable by the hotspot device on at least one given cell indicated in the list, in which, when the measurements are determined to be performable for the at least one given cell, the communication includes a positive acknowledgement with an indication of each first indicated in the list for which the measurements are determined to be performable, and when the measurements are determined not to be performable on any cell indicated in the list, the communication includes a negative acknowledgement with an indication the measurements are determined to be not performable for any of the cell indicated in the list, in which the communication of the indication from the hotspot device notifies whether the client device is to perform measurements on a given cell indicated in the list.

43. The method of claim 42, further comprising:
controlling, by the processing device, at the client device, entering into a Cellular Neighbor Measurement Broadcast over SRWL (CNMBOS) mode with the hotspot device, when the communication includes the positive acknowledgement.

44. The method of claim 43, further comprising:
controlling, by the processing device, at the client device,
when at least one periodic measurements is performed on each of the first cells at the hotspot device,
receiving details of the measurements performed for the at the at least one periodic measurements in a measurements report transmitted from the hotspot device, and
cell reselection or cell selection based on at least one of Received Signal Strength Indicator (RSSI), Reference Signal Received power (RSRP), Reference Signal Received Quality (RSRQ) and relative time offset (RTO) information indicated in the measurements report.

45. The method of claim 43, further comprising:
controlling, by the processing device, at the client device,
when the measurement reports is received from the hotspot device, performing cell detection for one detected cell in the measurements report,
when the one detected cell is detected from the cell detection, synchronizing to the one detected cell for cell reselection or cell selection, and
when the one detected cell is synchronized to by the client device, mapping a neighbor cell RTO from the measurements report to RTOs relative to the one detected cell on which the client device is currently camped.

46. The method of claim 43, further comprising:
controlling, by the processing device, at the client device,
when the client device can no longer maintain the SRWL with, or disconnects from, the hotspot device, exiting the CNMBOS mode and starting neighbor cell measurements at the client device according to a predetermined normal Radio Access Technology (RAT) type specific measurement procedures.

47. The method of claim 43, further comprising:
controlling, by the processing device, at the client device,
when the client device is disconnected from the hotspot device and unable to find another hotspot device in a vicinity of the client device, starting neighbor cell measurements from the WWAN.

48. The method of claim 43, further comprising:
controlling, by the processing device, at the client device,
when the client device is in idle mode or in active communication with the WWAN, requesting the hotspot device to perform neighbor cell measurements.

49. The method of claim 43, further comprising:
controlling, by the processing device, at the client device,
when the client device is disconnected from the hotspot device and unable to find another hotspot device in a current location of the client device, starting neighbor cell measurements at the client device.

50. The method of claim 43, further comprising:
controlling, by the processing device, at the client device,
when the client device enters the CNMBOS mode, turning off a Radio Frequency (RF) receiver of a cellular modem of, and entering a power save state at, the client device, based on determination that a neighbor cell measurement does not need to be performed at the client device.

51. The method of claim 43, further comprising:
controlling, by the processing device, at the client device,
when a change of at least one given cell indicated in the list is detected at the client device, transmitting a WWAN Measurements Update Request message to the hotspot device, to cause a change in scheduling of measurements at the hotspot device.

52. The method of claim 43, further comprising:
controlling, by the processing device, at the client device,
performing measurements for a given cell of the first cells after entering into the CNMBOS mode; and
estimating, and compensating for, a difference in the measurements by the client device and the measurements by the hotspot device.

53. The method of claim 52, further comprising:
controlling, by the processing device, at the client device,
when a predetermined number of WWAN Measurements Report messages are received by the client device in the CNMBOS mode,
for each cell, comparing the measurements of the client device against an average of values received in the WWAN Measurements Report and estimating a compensation value for each measurement metric of the measurements of the client device; and
stopping performing the measurements by the client device and starting using information of a report of the measurements from the hotspot device in combination with the compensation values for at least one of a cell reselection or handover decision.

54. The method of claim 53, wherein the measurements of the client device include at least one metric of Received Signal Strength Indicator (RSSI), Reference Signal Received power (RSRP) or Reference Signal Received Quality (RSRQ).

55. The method of claim 53, wherein the estimating the compensation value for each measurement metric of the measurements of the client device is performed periodically for updating the compensation values.

56. The method of claim 42,
wherein the client device is preconfigured with at least one of a set of Radio Access Technology (RAT) types, frequency or given cell for which the client device is expected to perform the measurements.

57. An apparatus for communication of measurement information in a wireless communication network, the apparatus comprising:
circuitry configured to control, at a client device communicatively connectable with a hotspot device via other than a Wireless Wide Area Network (WWAN) of the wireless communication network,
transmitting to the hotspot device, over a Short Range Wireless Link (SRWL), a request to perform measurements on at least one of a serving cell or at least one neighbor cell of the client device indicated on a list transmitted with the request; and
receiving, at the client device, a communication from the hotspot device based on a determination at the hotspot device, using a neighbor cell measurement schedule for the hotspot device, whether measurements are performable by the hotspot device on at least one given cell indicated in the list,
in which, when the measurements are determined to be performable for the at least one given cell, the communication includes a positive acknowledgement with an indication of each first indicated in the list for which the measurements are determined to be performable, and
when the measurements are determined not to be performable on any cell indicated in the list, the communication includes a negative acknowledgement with an indication the measurements are determined to be not performable for any of the cell indicated in the list, in which the communication of the indication from the hotspot device notifies whether the client device is to perform measurements on a given cell indicated in the list.

58. A wireless communication device comprising:

a receiver to receive a wireless communication; and a processing device configured for communication of measurement information in a wireless communication network, wherein the wireless communication device as a client device is communicatively connectable with a hotspot device via other than a Wireless Wide Area Network (WWAN) of the wireless communication network wherein the processing device is configured to control:

transmitting to the hotspot device, over a Short Range Wireless Link (SRWL), a request to perform measurements on at least one of a serving cell or at least one neighbor cell of the communication device indicated on a list transmitted with the request; and receiving, at the communication device, a communication from the hotspot device based on a determination at the hotspot device, using a neighbor cell measurement schedule for the hotspot device, whether measurements are performable by the hotspot device on at least one given cell indicated in the list, in which, when the measurements are determined to be performable for the at least one given cell, the communication includes a positive acknowledgement with an indication of each first indicated in the list for which the measurements are determined to be performable, and when the measurements are determined not to be performable on any cell indicated in the list, the communication includes a negative acknowledgement with an indication the measurements are determined to be not performable for any of the cell indicated in the list, in which the communication of the indication from the hotspot device notifies whether the client device is to perform measurements on a given cell indicated in the list.

* * * * *